US011378826B2

(12) United States Patent
Kissa et al.

(10) Patent No.: US 11,378,826 B2
(45) Date of Patent: *Jul. 5, 2022

(54) ELECTRICAL-OPTICAL MODULATOR

(71) Applicant: Lumentum Operations LLC, San Jose, CA (US)

(72) Inventors: Karl Kissa, Gilroy, CA (US); David Glassner, Morgan Hill, CA (US); Stephen Jones, Northamptonshire (GB); Robert Griffin, Northamptonshire (GB); John M. Heaton, Worcestershire (GB)

(73) Assignee: Lumentum Operations LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/836,338

(22) Filed: Mar. 31, 2020

(65) Prior Publication Data

US 2021/0080797 A1  Mar. 18, 2021

Related U.S. Application Data

(63) Continuation-in-part of application No. 16/835,872, filed on Mar. 31, 2020.
(Continued)

(51) Int. Cl.
  *G02F 1/225* (2006.01)
  *G02F 1/01* (2006.01)
  (Continued)

(52) U.S. Cl.
  CPC ............. *G02F 1/011* (2013.01); *G02F 1/025* (2013.01); *G02F 1/0356* (2013.01);
  (Continued)

(58) Field of Classification Search
  CPC .......... G02B 2006/12142; G02F 1/011; G02F 1/2255; G02F 1/0356; G02F 1/2257; G02F 1/212; G02F 2201/127; G02F 2203/50
  (Continued)

(56) References Cited

U.S. PATENT DOCUMENTS

| 4,448,479 A | 5/1984 | Alferness |
| 4,553,810 A | 11/1985 | Alferness et al. |

(Continued)

OTHER PUBLICATIONS

"Design, analysis, and transmission system performance of a 41 GHz silicon photonic modulator" by Patel et al, Optics Express, vol. 23, No. 11, pp. 14263-14287 (Year: 2015).*
(Continued)

*Primary Examiner* — Robert Tavlykaev
(74) *Attorney, Agent, or Firm* — Harrity & Harrity, LLP

(57) ABSTRACT

An electrical-optical modulator may include a first section configured for a first electrical-optical interaction between one or more optical waveguides and one or more signal electrodes. The electrical-optical modulator may include a second section configured to increase or decrease a relative velocity of signals of the one or more signal electrodes to optical signals of the one or more optical waveguides relative to the first section. The electrical-optical modulator may include a third section configured for a second electrical-optical interaction between the one or more optical waveguides and the one or more signal electrodes according to an opposite modulation polarity relative to the first section.

14 Claims, 25 Drawing Sheets

Related U.S. Application Data

(60) Provisional application No. 62/901,504, filed on Sep. 17, 2019.

(51) Int. Cl.
*G02F 1/035* (2006.01)
*G02F 1/025* (2006.01)
*G02B 6/12* (2006.01)
*G02F 1/21* (2006.01)

(52) U.S. Cl.
CPC .......... *G02F 1/2255* (2013.01); *G02F 1/2257* (2013.01); *G02B 2006/12142* (2013.01); *G02F 1/212* (2021.01); *G02F 2201/127* (2013.01); *G02F 2202/102* (2013.01); *G02F 2203/50* (2013.01)

(58) Field of Classification Search
USPC .......................................... 385/1–3
See application file for complete search history.

(56) References Cited

U.S. PATENT DOCUMENTS

| | | | |
|---|---|---|---|
| 5,091,981 A * | 2/1992 | Cunningham | G02F 1/0356 385/3 |
| 6,310,700 B1 * | 10/2001 | Betts | G02F 1/2255 359/2 |
| 6,377,717 B1 * | 4/2002 | Kimber | G02F 1/225 385/2 |
| 6,580,840 B1 | 6/2003 | McBrien et al. | |
| 7,082,237 B2 * | 7/2006 | Walker | G02F 1/2257 385/39 |
| 7,251,408 B1 | 7/2007 | Gunn, III et al. | |
| 8,218,914 B2 | 7/2012 | Kissa | |
| 8,530,821 B2 | 9/2013 | Green et al. | |
| 9,817,249 B2 * | 11/2017 | Doerr | G02F 1/011 |
| 9,939,708 B2 * | 4/2018 | Aimone | G02F 1/2257 |
| 10,120,212 B2 | 11/2018 | Baehr-Jones et al. | |
| 10,241,354 B1 | 3/2019 | Gill | |
| 10,295,847 B1 | 5/2019 | Tytgat et al. | |
| 10,416,525 B2 | 9/2019 | Zhou | |
| 10,831,081 B2 * | 11/2020 | Vera Villarroel | G02F 1/2255 |
| 2002/0154842 A1 * | 10/2002 | Betts | G02F 1/0316 385/2 |
| 2004/0047529 A1 | 3/2004 | Soda | |
| 2005/0123242 A1 | 6/2005 | Walker et al. | |
| 2008/0095485 A1 | 4/2008 | Sugiyama | |
| 2009/0263078 A1 | 10/2009 | Hosomi et al. | |
| 2014/0112611 A1 * | 4/2014 | Vermeulen | G02F 1/2257 385/3 |
| 2015/0212346 A1 | 7/2015 | Zheng et al. | |
| 2016/0363834 A1 | 12/2016 | Velthaus et al. | |
| 2017/0075148 A1 | 3/2017 | Baudot et al. | |
| 2019/0253149 A1 | 8/2019 | Ding et al. | |
| 2019/0324345 A1 | 10/2019 | Vera Villarroel et al. | |
| 2019/0361315 A1 | 11/2019 | Zhou | |
| 2020/0225556 A1 * | 7/2020 | Hayashi | G02B 6/29344 |
| 2020/0285084 A1 | 9/2020 | Ji et al. | |
| 2020/0363665 A1 * | 11/2020 | Latrasse | G02B 6/12002 |

OTHER PUBLICATIONS

"Design, Analysis, and Performance of a Silicon Photonic Traveling Wave Mach-Zehnder Modulator", an MS degree thesis by Patel (Year: 2014).*
Yoshihiro Ogiso, et. al., "Over 67 GHz Bandwidth and 1.5 V Vπ InP-Based Optical IQ Modulator With n-i-p-n Heterostructure," Journal of Lightwave Technology, vol. 35, No. 8, Apr. 15, 2017, pp. 1450-1455.
Robert A. Griffin, et. al., "InP Mach-Zehnder Modulator Platform for 10/40/100/200-GB/s Operation," IEEE Journal of Selected Topics in Quantum Electronics, vol. 19, No. 6, Nov./Dec. 2013, 3401209.
Haitao Chen, "Development of an 80 Gbit/s InP-based Mach-Zehnder Modulator," Doctoral Dissertation, Elektrotechnik und Informatik der Technischen Universitat Berlin, 2007.
Chen Wang, et. al., "100 GHz Low Voltage Integrated Lithium Niobate Modulators," CLEO 2018 Conference Proceedings, Paper SM3B.4.
D. W. Dolfi, et. al., "40 GHz electro-optic modulator with 7.5V drive voltage," Electronics Letters, Apr. 28, 1988, vol. 24, No. 9, pp. 528-529.
Norihide Kashio and Yusuke Nasu, "Compact Optical Modulator and Coherent Optical Subassemblies for Beyond 100G Transport Network," NTT Technical Review, vol. 14 No. 9 Sep. 2016, pp. 1-5.
Saeed Sharif Azadeh, et. al., "Low Vπ Silicon photonics modulators with highly linear epitaxially grown phase shifters," Optics Express, vol. 23, No. 18, Sep. 7, 2015.
Jianying Zhou, Jian Wang, Likai Zhu, Qun Zhang, and Jin Hong, "Silicon Photonics Carrier Depletion Modulators Capable of 85Gbaud 16QAM and 64Gbaud 64QAM," OFC 2019 Technical Digest, paper TYu2H.2.
Yanyang Zhou et al., "Modeling and optimization of a single-drive push-pull silicon Mach-Zehnder modulator," Photon. Res., vol. 4, No. 4, Aug. 2016, pp. 153-161.
Hui Yu, et. al., "Doping Geometries for 40G Carrier-Depletion-Based Silicon Optical Modulators," OFC 2012 Technical Digest, paper OW4F.4.
Hui Yu, et. al., "Silicon Carrier-Depletion-Based Mach-Zehnder and Ring Modulators with Different Doping Patterns for Telecommunication and Optical Interconnect," ICTON 2012 Technical Digest, paper Th.A4.3.
Junichi Fujikata, et. al., "High-Performance Si Optical Modulator with Strained p-SiGe Layer and its Application to 25 Gbps Optical Transceiver," IEEE publication 2017, pp. 25-26.
Kensuke Ogawa, et. al., "Silicon Mach-Zehnder Modulator of Extinction Ratio beyond 10dB at 10.0-12.5Gbps," ECOC 2011 Technical Digest, paper We.10.P1.28.
Nan Qi, et. al., "A 25 GB/s. 520mW, 6.4Vpp silicon-photonic Mach-Zehnder modulator with distributed driver in CMOS, OFC 2015 Technical Digest, paper W1B.3.
Toshihiko Baba, "Slow Light Devices in Silicon Photonics," OECC/PS2016 Techical Digest, IEICE, paper WE3-1.
Hasitha Jayatilleka, et. al., "Analytical Model and Fringing-Field Parasitics of Carrier-Depletion Silicon-on-Insulator Optical Modulation Diodes," IEEE Photonics Journal, vol. 5, No. 1, Feb. 2013.
Jianying Zhou, "Photonic Integrated Circuits: Silicon-photonic-based PIC modulators scale up for dense datacenter interconnects," Laser Focus World, Dec. 24, 2019.
Breyne et al., "Electro-Optic Frequency Response Shaping in High Speed Mach-Zehnder Modulators," Paper Th2A.11, presented Mar. 8-12, 2020, 3 Pages.
Chen, et al., "Optimal Design of Broadened Flat Bandpass Electro-optic Phase Modulator Based on Aperiodic Domain-inverted Grating," Journal of Optics A: Pure and Applied Optics, May 2003, vol. 5 (3), pp. 159-162.
Wikipedia., "Cutoff Frequency," Aug. 6, 2021, 5 pages. Retrieved from Internet:[URL:https://en.wikipedia.org/wiki/Cutoff_frequency].
Zhu, et al., "Optimization of Phase-reversal Travelling-wave Optical Modulators," Microwave and Optical Technology Letters, Jul. 1989, vol. 2 (7), pp. 240-244.
Zolotov, et al., "Broadening the Bandwidth and Increasing the Efficiency of Traveling-wave Integrated-optic Modulators," Proceedings of SPIE 1932, Guided Wave Optics, Moscow, Russian Federation, May 1993, 15 pages.

* cited by examiner

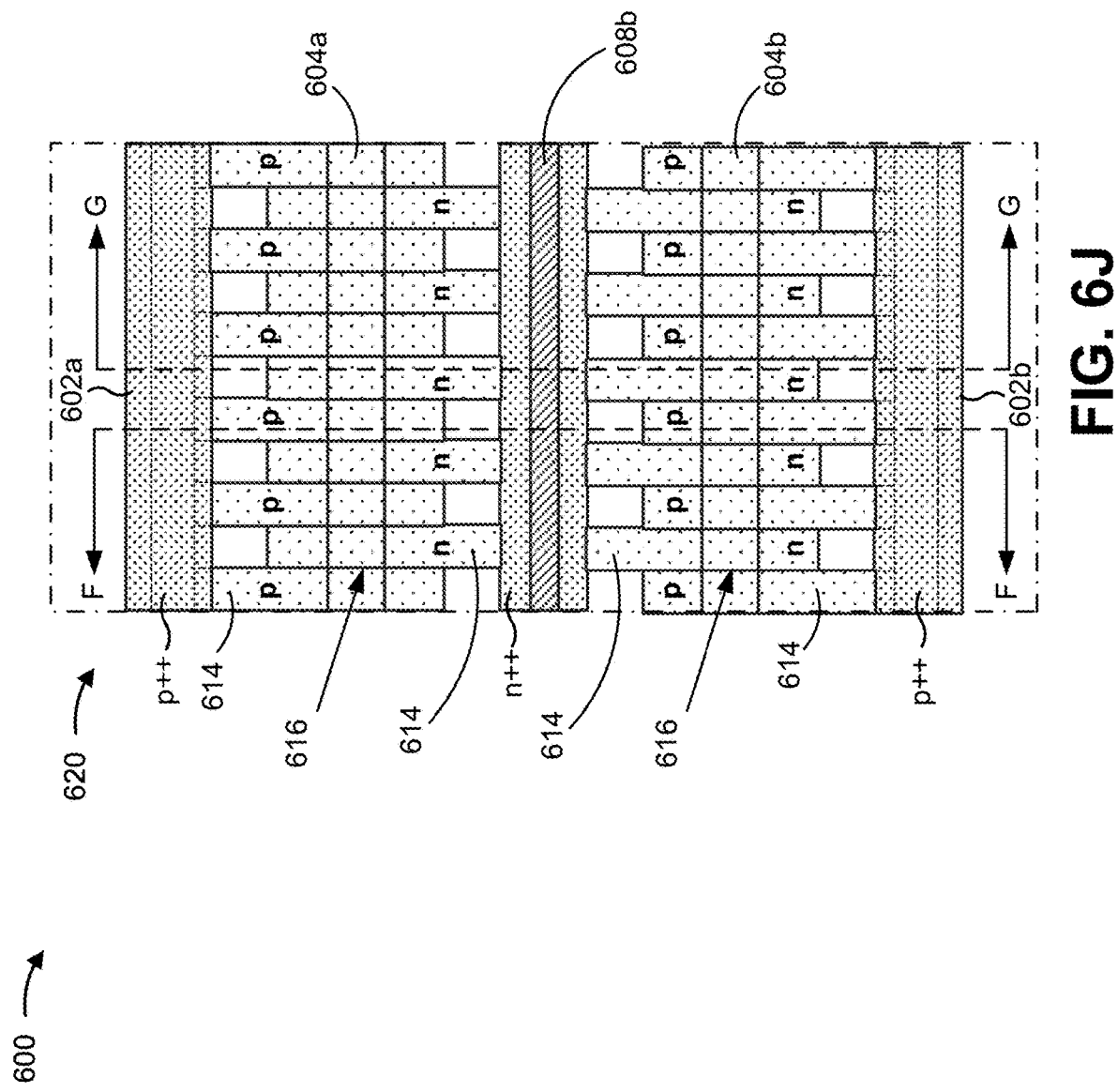

ELECTRICAL-OPTICAL MODULATOR

RELATED APPLICATIONS

This application claims priority to U.S. Provisional Patent Application No. 62/901,504, filed on Sep. 17, 2019 and entitled "EQUALIZED MODULATOR UTILIZING OPTICAL TIME DELAY," the content of which is incorporated by reference herein in its entirety. This application is a continuation-in-part (CIP) of U.S. patent application Ser. No. 16/835,872, filed on Mar. 31, 2020 and entitled "ELECTRICAL-OPTICAL MODULATOR," the content of which is incorporated by reference herein in its entirety.

TECHNICAL FIELD

The present disclosure relates to electrical-optical modulators and, more particularly, to electrical-optical modulators utilizing a velocity-changed electrode signal.

BACKGROUND

Optical modulators, such as electrical-optical modulators, impress or modulate electrical signals, such as radio frequency (RF) signals or microwave signals, onto an optical beam in order to generate a modulated optical beam that carries data. A typical electrical-optical modulator may be a voltage-controlled device that includes a traveling-wave electrode structure positioned in close proximity to an optical waveguide. The electrode structure produces an electric field that overlaps the optical waveguide over a predetermined distance (the interaction length) and causes an electromagnetic interaction that modulates the optical signal. For example, an electrical-optical modulator may include a set of RF signal electrodes, a set of ground electrodes, and a set of coplanar optical waveguides. The set of coplanar waveguides can be part of a Mach-Zehnder (MZ) interferometer.

SUMMARY

According to some implementations, an electrical-optical modulator may include one or more optical waveguides to propagate optical signals in a direction of propagation, and one or more signal electrodes to propagate signals in the direction of propagation in order to modulate the optical signals through electrical-optical interaction. The one or more signal electrodes may include a velocity change section, a first modulation section preceding the velocity change section in the direction of propagation, and a second modulation section following the velocity change section in the direction of propagation. An optical waveguide, of the one or more optical waveguides, may include a first section and a second section configured to be associated with opposite modulation polarities based on an association with the first modulation section and the second modulation section of the one or more signal electrodes. The velocity change section may be configured to increase or decrease a relative velocity of the signals to the optical signals relative to the first modulation section.

According to some implementations, an electrical-optical modulator may include a first section configured for a first electrical-optical interaction between one or more optical waveguides and one or more signal electrodes, a second section configured to increase or decrease a relative velocity of signals of the one or more signal electrodes to optical signals of the one or more optical waveguides relative to the first modulation section, and a third section configured for a second electrical-optical interaction between the one or more optical waveguides and the one or more signal electrodes according to an opposite modulation polarity relative to the first section.

According to some implementations, an electrical-optical modulator may include one or more velocity change sections, and one or more modulation polarity reversal sections. The electrical-optical modulator may have a frequency response characterized by a modulation bandwidth above a threshold value.

BRIEF DESCRIPTION OF THE DRAWINGS

FIG. 6J is a diagram of an enlarged detail view of the electrical-optical modulator of FIG. 6A.

DETAILED DESCRIPTION

Figure 1:
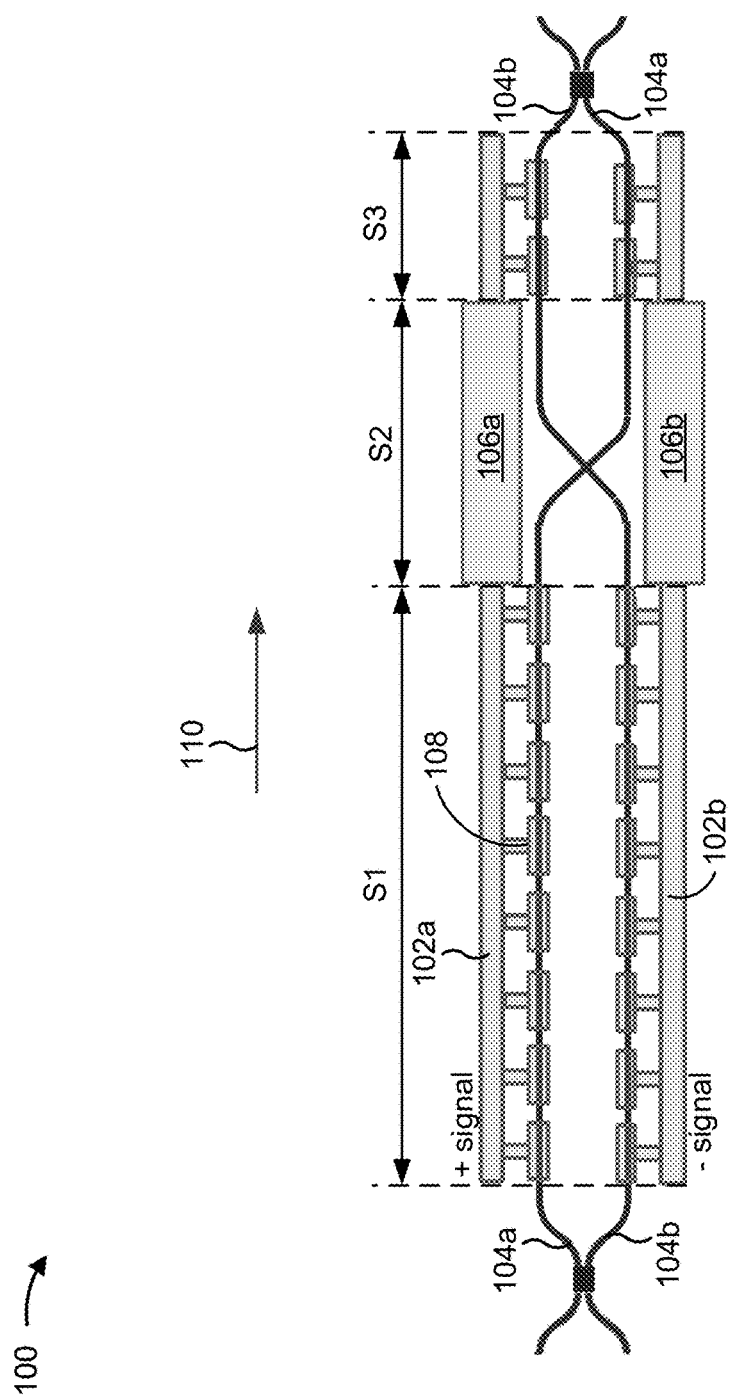
FIGS. 1-4 are diagrams of example electrical-optical modulators described herein.

The following detailed description of example implementations refers to the accompanying drawings. The same reference numbers in different drawings may identify the same or similar elements.

An electrical-optical modulator may modulate an optical signal over a bandwidth. Typically, the bandwidth may be increased by reducing electrical (e.g., RF) signal loss, such as by reducing an interaction length of an electrode and an optical waveguide of the electrical-optical modulator (e.g., by reducing a length of the electrode). However, reducing the interaction length may require an increase in a drive voltage of the electrical-optical modulator. Other approaches may use an equalization technique to increase bandwidth and reduce drive voltage. According to the equalization technique, the electrical-optical modulator may include an electrode path delay (e.g., a circuitous path of the electrode) to provide a time delay of the electrical signal, and may include a modulation polarity reversal, for example, to adapt to a phase shift caused by the time delay. However, the electrode path delay also may increase electrical signal loss (e.g., by increasing the length of the electrode). Moreover, the electrode path delay increases a footprint of the electrical-optical modulator, which may cause interference (e.g., crosstalk) between electrodes of multiple nested electrical-optical modulators.

Some implementations described herein provide an electrical-optical modulator that includes one or more modulation sections, a velocity change section associated with one or more signal electrodes of the electrical-optical modulator, and a modulation polarity reversal of one or more optical waveguides of the electrical-optical modulator in one or more of the modulation sections. In this way, the electrical-optical modulator is equalized to provide a frequency response with increased modulation bandwidth. Moreover, the velocity change section enables a length of an electrode of the electrical-optical modulator to be minimized, thereby reducing electrical (e.g., RF) signal loss that may decrease bandwidth. Furthermore, the velocity change section enables compact geometries for the electrical-optical modulator that can reduce or eliminate interference with other nearby (e.g., nested) electrical-optical modulators.

FIGS. 1-4, 6A, 8A, and 9 are diagrams of example electrical-optical modulators described herein. An electrical-optical modulator may be a modulator that uses a Pockels effect, an electro-optic effect, a quantum-confined Stark effect, a plasma dispersion effect, and/or the like, to change a phase of light under an applied voltage. In some implementations, an electrical-optical modulator may be an MZ modulator. For example, an electrical-optical modulator may be an indium phosphide (InP) MZ modulator. Alternatively, an electrical-optical modulator may employ silicon photonics, polymer, lithium niobate, thin lithium niobate, or gallium arsenide technologies.

In some implementations, an electrical-optical modulator may include one or more optical waveguides and one or more signal electrodes (e.g., one or more traveling-wave electrodes). A waveguide may propagate an optical signal in a direction of propagation of an electrical-optical modulator. An electrode may propagate an electrical signal (e.g., an RF signal, a microwave signal, and/or the like) in the direction of propagation. The electrical signal may modulate the optical signal through an electrical-optical interaction.

In some implementations, an electrical-optical modulator may include a set of waveguides (e.g., two waveguides). For example, an optical splitter may split an input optical signal to a first waveguide and a second waveguide of the electrical-optical modulator, and an optical combiner may combine an output of the first waveguide and the second waveguide. In some implementations, an electrical-optical modulator may include a set of electrodes (e.g., two electrodes). That is, the electrical-optical modulator may have a differential drive voltage. In such a case, a first electrode may propagate a positive polarity signal and a second electrode may propagate a negative polarity signal. Alternatively, an electrical-optical modulator may include a single electrode. That is, the electrical-optical modulator may have a single drive voltage.

As shown in FIGS. 1-4, 6A, 8A, and 9 an electrical-optical modulator may have a first section of length S1, a second section of length S2, and a third section of length S3. In some implementations, S1 may be greater than S2 or S3. Additionally, or alternatively, S2 may be greater than S3. The first section, the second section, and the third section may be referred to herein as S1, S2, and S3, respectively. The first section S1 and the third section S3 may provide modulation for the electrical-optical modulator. That is, in the first section S1 and the third section S3, a waveguide and an electrode may interact (e.g., via electrical-optical interaction, via a quantum-confined Stark effect, via a plasma effect, and/or the like). Moreover, an electrical-optical interaction in the first section S1 between one or more waveguides and one or more electrodes, and an electrical-optical interaction in the third section S3 between the waveguides and the electrodes, may be according to opposite modulation polarities. In other words, a waveguide may be associated with opposite modulation polarities in the first section S1 and the third section S3.

In the second section S2, an electrode may be configured to change (e.g., increase or decrease) a velocity of signals propagated by the electrode relative to a velocity of the signals when passing through the first section S1 and/or the third section S3. For example, for an InP MZ modulator, the electrode may be configured to increase a velocity of signals in the second section S2. Moreover, in the second section S2, a velocity of optical signals propagated by a waveguide may remain constant (e.g., relative to sections S1 and S3). In some aspects, in the second section S2, a relative velocity of electrical signals of the electrode to optical signals of the waveguide may be different than in the first section S1 and/or the third section S3. Accordingly, signal velocities of the electrode and the waveguide may not be matched in the second section S2. In this way, the electrical-optical modulator may be equalized and may have a frequency response characterized by a modulation bandwidth that satisfies (e.g., is greater than) a threshold value (e.g., 60 gigahertz (GHz), 75 GHz, 80 GHz, or 85 GHz). Moreover, electrodes and waveguides of the electrical-optical modulator may be in a straight line (e.g., configured to provide a direct path for a signal). In this way, the electrical-optical modulator has a compact geometry that can reduce or eliminate interference with other nearby (e.g., nested) electrical-optical modulators.

FIG. 1 is a diagram of an example electrical-optical modulator 100 described herein. As shown in FIG. 1, electrical-optical modulator 100 may include a first signal electrode 102a, a second signal electrode 102b, a first optical waveguide 104a, and a second optical waveguide 104b. Electrical signals of the electrodes 102 may interact with optical signals of the waveguides 104 via a plurality of segmented loading lines 108. For example, the loading lines 108 may cover (e.g., abut, attach to, be in proximity of, cause electrical-optical interaction with, or otherwise be in association with) portions of the waveguides 104. The electrodes 102 may be configured to propagate an electrical signal in a direction of propagation 110 of the electrical-optical modulator 100, and the waveguides 104 may be configured to propagate an optical signal in the direction of propagation 110.

As shown in FIG. 1, the first electrode 102a may include a first modulation section (spanning S1), a velocity change section 106a (spanning S2), and a second modulation section (spanning S3). Similarly, the second electrode 102*b* may include a first modulation section (spanning S1), a velocity change section 106*b* (spanning S2), and a second modulation section (spanning S3). In a velocity change section 106, signals of an electrode 102 may have a different (e.g., increased) velocity relative to a first modulation section and/or a second modulation section of the electrode 102. Additionally, or alternatively, in a velocity change section 106, a relative velocity of signals of an electrode 102 to optical signals of a waveguide 104 may be different relative to a first modulation section and/or a second modulation section of the electrode 102. In this way, the electrical signals may change phase (e.g., a phase shift of 180 degrees) relative to the imparted modulation on the optical signals of a waveguide 104 in the first modulation section (spanning S1).

In some implementations, the velocity change section 106 of the electrode 102 may be configured to have an RF mode index that is different (e.g., less) than an RF mode index of the first modulation section or the second modulation section of the electrode 102, to thereby cause a signal velocity change. For example, the RF mode index may be less than 3 in the velocity change section 106, and the RF mode index may be greater than 3 in the first modulation section or the second modulation section. Additionally, or alternatively, the velocity change section 106 of the electrode 102 may be configured to have an RF mode index that is different (e.g., less) than an optical mode index of a corresponding section of a waveguide 104 (e.g., a corresponding section of the waveguide 104 in section S2). For example, the RF mode index of the electrode 102 may be less than 3, and the optical mode index of the waveguide 104 may be greater than 3. As an example, the RF mode index may be 2.6, and the optical mode index may be 3.7.

In some implementations, the velocity change section 106 of the electrode 102 may have an electrode width (e.g., transverse to the direction of propagation 110) that is different (e.g., greater) than an electrode width of the first modulation section or the second modulation section of the electrode 102, to thereby cause a signal velocity change. For example, the electrode width in the velocity change section 106 may be at least 10%, at least 25%, at least 50%, at least 75%, or at least 100% greater than the electrode width in the first modulation section or the second modulation section.

In some implementations, as shown in FIG. 1, the velocity change section 106 of the electrode 102 may not include a loading line 108, and the first modulation section or the second modulation section of the electrode 102 may include one or more loading lines 108, to thereby cause a signal velocity change. Alternatively, the velocity change section 106 of the electrode 102 may include a quantity of loading lines 108 that is different (e.g., less) than a quantity of loading lines 108 included in the first modulation section or the second modulation section of the electrode 102. For example, the velocity change section 106 may include one or two loading lines 108, and the first modulation section or the second modulation section may include greater than one or two loading lines 108, respectively.

As shown in FIG. 1, a first section (associated with section S1) and a second section (associated with section S3) of a waveguide 104 may be configured to have opposite modulation polarities based on an association with a first modulation section and a second modulation section of the electrodes 102. In some implementations, the opposite modulation polarities are based on a crossing of the first waveguide 104*a* and the second waveguide 104*b*. For example, in the first section S1, the first electrode 102*a* (+ signal) may modulate an optical signal of the first waveguide 104*a*, and the second electrode 102*b* (− signal) may modulate an optical signal of the second waveguide 104*b*. Continuing with the previous example, in the third section S3, the first electrode 102*a* (+ signal) may modulate an optical signal of the second waveguide 104*b*, and the second electrode 102*b* (− signal) may modulate an optical signal of the first waveguide 104*a*, thereby reversing modulation polarity experienced by the second waveguide 104*b* relative to the first waveguide 104*a*. In particular, in the second section S2, the first waveguide 104*a* and the second waveguide 104*b* may cross, to thereby redirect the first waveguide 104*a* to the second electrode 102*b* and the second waveguide 104*b* to the first electrode 102*a*. In this way, modulation polarity may be reversed while a relative position of the loading lines 108 in the first section S1 and the third section S3 remains consistent.

In some implementations, the first waveguide 104*a* and the second waveguide 104*b* may cross substantially orthogonally in the second section S2. For example, the first waveguide 104*a* and the second waveguide 104*b* may cross at an angle of about 90 degrees (e.g., within ±10%, ±5%, or ±1%). In some implementations, the first waveguide 104*a* and the second waveguide 104*b* may cross at an angle greater than 75 degrees. In this way, optical loss and/or crosstalk due to the crossing may be reduced. In some implementations, the width, or one or more other geometrical features, of the waveguides 104 may be different at a point of the crossing (or in the second section S2) relative to other portions of the waveguides 104.

As indicated above, FIG. 1 is provided merely as an example. Other examples may differ from what is described with regard to FIG. 1.

Figure 2:
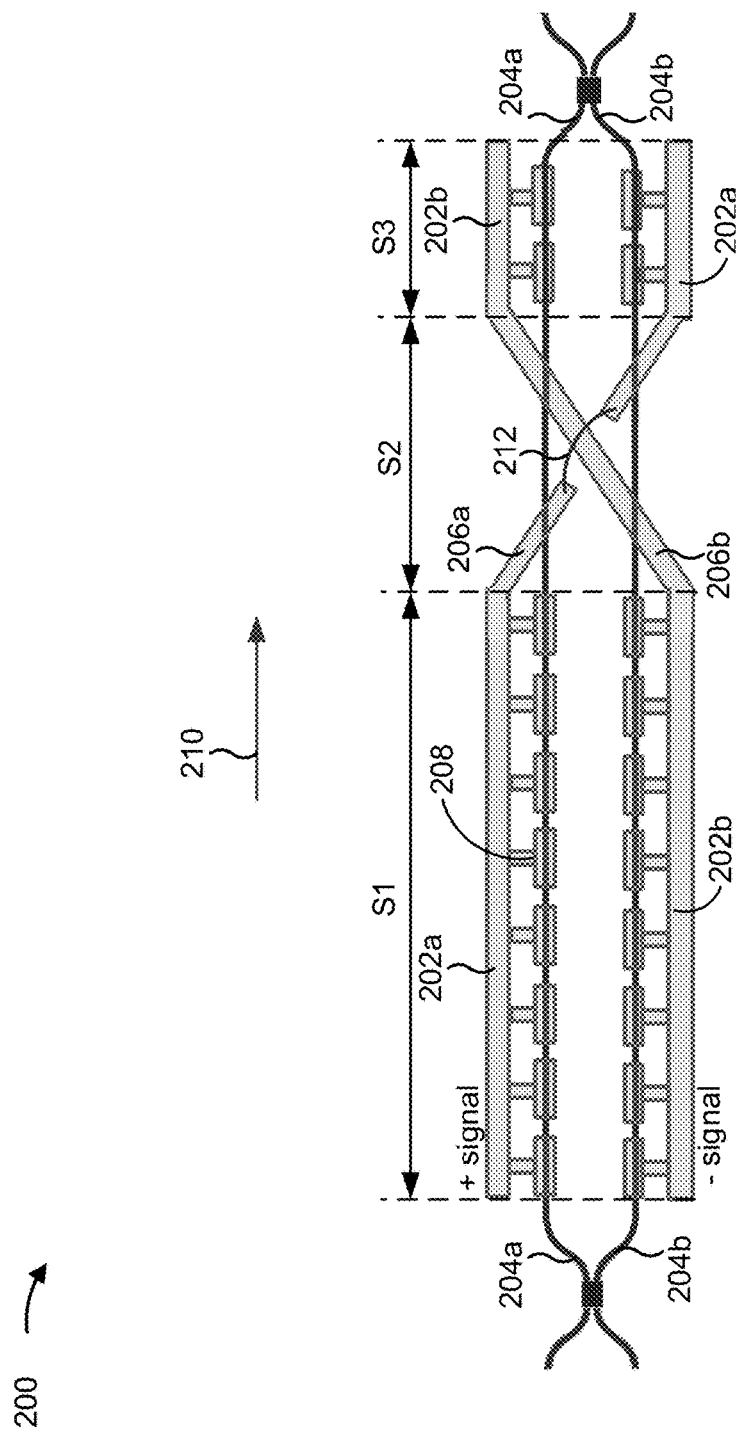

FIG. 2 is a diagram of an example electrical-optical modulator 200 described herein. As shown in FIG. 2, electrical-optical modulator 200 may include a first signal electrode 202*a*, a second signal electrode 202*b*, a first optical waveguide 204*a*, and a second optical waveguide 204*b*. Electrical signals of the electrodes 202 may interact with optical signals of the waveguides 204 via a plurality of segmented loading lines 208, as described above in connection with FIG. 1. The electrodes 202 may be configured to propagate an electrical signal in a direction of propagation 210 of the electrical-optical modulator 200, and the waveguides 204 may be configured to propagate an optical signal in the direction of propagation 210.

As shown in FIG. 2, the first electrode 202*a* may include a first modulation section (spanning S1), a velocity change section 206*a* (spanning S2), and a second modulation section (spanning S3), and the second electrode 202*b* may include a first modulation section (spanning S1), a velocity change section 206*b* (spanning S2), and a second modulation section (spanning S3), as described above in connection with FIG. 1. In a velocity change section 206, signals of an electrode 202 may have a different velocity relative to a first modulation section and/or a second modulation section of the electrode 202, as described above in connection with FIG. 1.

As shown in FIG. 2, a first section (associated with section S1) and a second section (associated with section S3) of a waveguide 204 may be configured to have opposite modulation polarities based on an association with a first modulation section and a second modulation section of the electrodes 202. In some implementations, the opposite modulation polarities are based on a crossing of the first electrode 202*a* and the second electrode 202*b*. For example, in the first section S1, the first electrode 202*a* (+ signal) may modulate an optical signal of the first waveguide 204a, and the second electrode 202b (− signal) may modulate an optical signal of the second waveguide 204b. Continuing with the previous example, in the third section S3, the first electrode 202a (+ signal) may modulate an optical signal of the second waveguide 204b, and the second electrode 202b (− signal) may modulate an optical signal of the first waveguide 204a, thereby reversing modulation polarity experienced by the second waveguide 204b relative to the first waveguide 204a. In particular, in the second section S2, the velocity change section 206a and the velocity change section 206b may cross, to thereby redirect the second electrode 202b to the first waveguide 204a and the first electrode 202a to the second waveguide 204b. In this way, modulation polarity may be reversed while a relative position of the loading lines 208 in the first section S1 and the third section S3 remains consistent.

In some implementations, the velocity change section 206a and the velocity change section 206b may cross substantially orthogonally. For example, the velocity change section 206a and the velocity change section 206b may cross at an angle of about 90 degrees (e.g., within ±10%, ±5%, or ±1%). In some implementations, the velocity change section 206a and the velocity change section 206b may cross at an angle greater than 75 degrees. In this way, signal loss and/or crosstalk due to the crossing may be reduced.

As shown in FIG. 2, the first electrode 202a may be segmented to enable the crossing of the first electrode 202a and the second electrode 202b. For example, the velocity change section 206a may include a gap. The velocity change section 206a may include a wire bond 212 that bridges the gap. Additionally, or alternatively, the second electrode 202b may include a gap and corresponding wire bond 212. In some implementations, velocity change section 206a may include a first via, an electrode on another electrode layer (e.g., below velocity change section 206a), and a second via. The vias may connect velocity change section 206a to the electrode on the other electrode layer, to thereby bridge the gap in the velocity change section 206a. In this case, the crossing may be below velocity change section 206b, rather than above, as in the case of a wire bond. Moreover, the velocity change sections 206 and the electrode on the other layer may be separated vertically by silicon dioxide or other insulator layers (e.g., in a manner used for silicon photonic Photonic Integrated Circuits (PICs)).

As indicated above, FIG. 2 is provided merely as an example. Other examples may differ from what is described with regard to FIG. 2.

Figure 3:
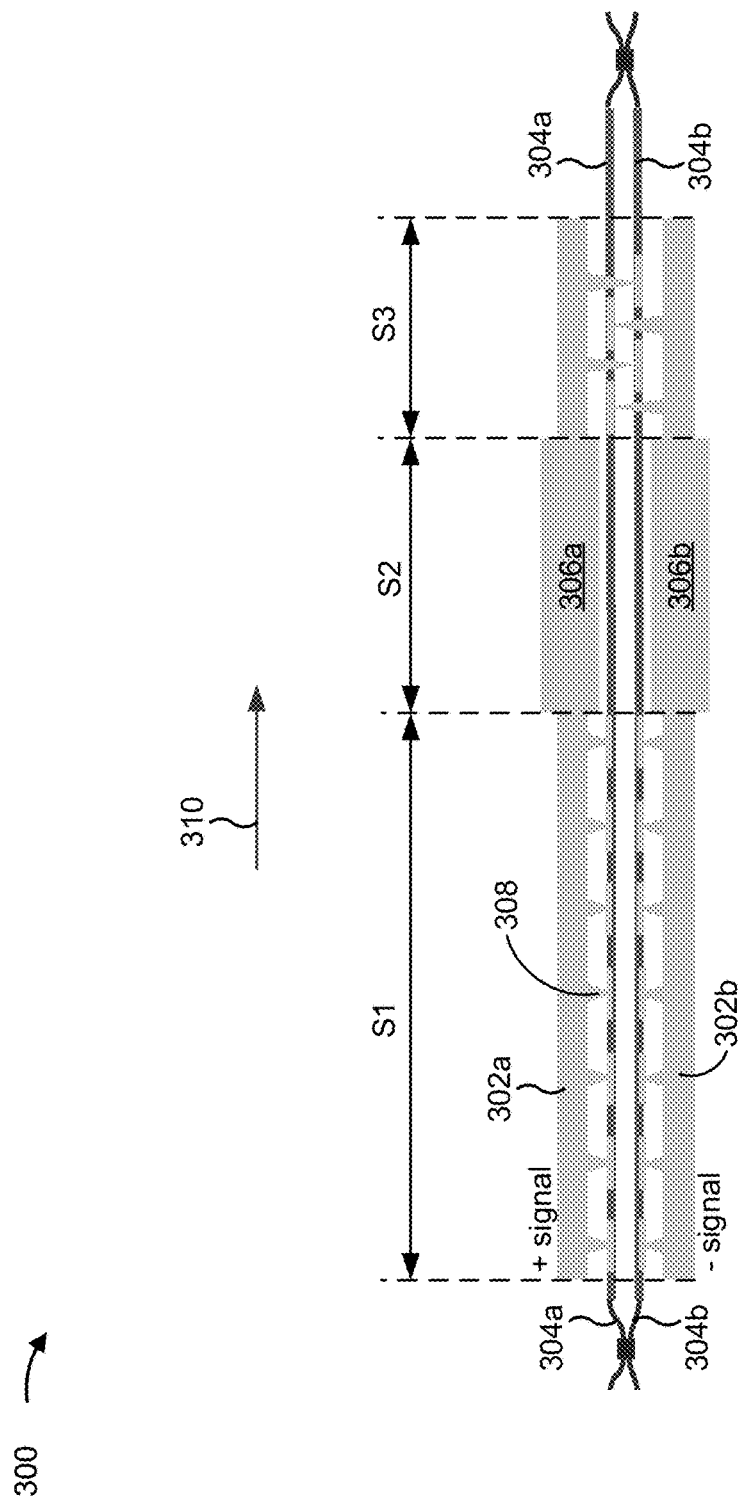

FIG. 3 is a diagram of an example electrical-optical modulator 300 described herein. As shown in FIG. 3, electrical-optical modulator 300 may include a first signal electrode 302a, a second signal electrode 302b, a first optical waveguide 304a, and a second optical waveguide 304b. Electrical signals of the electrodes 302 may interact with optical signals of the waveguides 304 via a plurality of segmented loading lines 308, as described above in connection with FIG. 1. The electrodes 302 may be configured to propagate an electrical signal in a direction of propagation 310 of the electrical-optical modulator 300, and the waveguides 304 may be configured to propagate an optical signal in the direction of propagation 310.

As shown in FIG. 3, the first electrode 302a may include a first modulation section (spanning S1), a velocity change section 306a (spanning S2), and a second modulation section (spanning S3), and the second electrode 302b may include a first modulation section (spanning S1), a velocity change section 306b (spanning S2), and a second modulation section (spanning S3), as described above in connection with FIG. 1. In a velocity change section 306, signals of an electrode 302 may have a different velocity relative to a first modulation section and/or a second modulation section of the electrode 302, as described above in connection with FIG. 1.

As shown in FIG. 3, a first section (associated with section S1) and a second section (associated with section S3) of a waveguide 304 may be configured to have opposite modulation polarities based on an association with a first modulation section and a second modulation section of the electrodes 302. In some implementations, the opposite modulation polarities are based on loading lines 308 of the first electrode 302a having an association with a first section of the first waveguide 304a and a second section of the second waveguide 304b, and loading lines 308 of the second electrode 302b having an association with a first section of the second waveguide 304b and a second section of the first waveguide 304a.

For example, in the first section S1, the first electrode 302a (+ signal) may modulate an optical signal of the first waveguide 304a, and the second electrode 302b (− signal) may modulate an optical signal of the second waveguide 304b. In particular, in the first section S1, loading lines 308 of the first electrode 302a may cover the first waveguide 304a, and loading lines 308 of the second electrode 302b may cover the second waveguide 304b. Continuing with the previous example, in the third section S3, the first electrode 302a (+ signal) may modulate an optical signal of the second waveguide 304b, and the second electrode 302b (− signal) may modulate an optical signal of the first waveguide 304a, thereby reversing modulation polarity experienced by the second waveguide 304b relative to the first waveguide 304a. In particular, in the third section S3, loading lines 308 of the first electrode 302a may cover the second waveguide 304b, and loading lines 308 of the second electrode 302b may cover the first waveguide 304a.

As indicated above, FIG. 3 is provided merely as an example. Other examples may differ from what is described with regard to FIG. 3.

Figure 4:
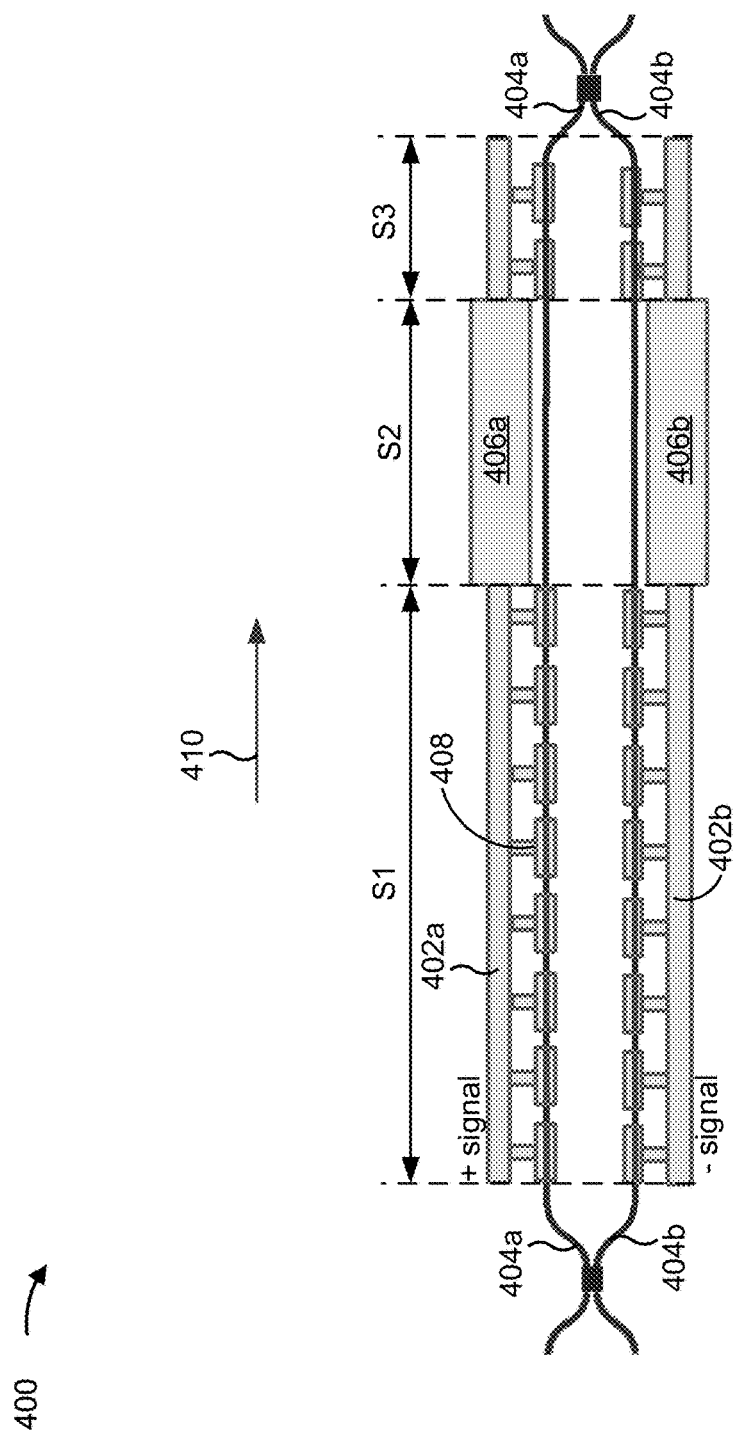

FIG. 4 is a diagram of an example electrical-optical modulator 400 described herein. As shown in FIG. 4, electrical-optical modulator 400 may include a first signal electrode 402a, a second signal electrode 402b, a first optical waveguide 404a, and a second optical waveguide 404b. Electrical signals of the electrodes 402 may interact with optical signals of the waveguides 404 via a plurality of segmented loading lines 408, as described above in connection with FIG. 1. The electrodes 402 may be configured to propagate an electrical signal in a direction of propagation 410 of the electrical-optical modulator 400, and the waveguides 404 may be configured to propagate an optical signal in the direction of propagation 410.

As shown in FIG. 4, the first electrode 402a may include a first modulation section (spanning S1), a velocity change section 406a (spanning S2), and a second modulation section (spanning S3), and the second electrode 402b may include a first modulation section (spanning S1), a velocity change section 406b (spanning S2), and a second modulation section (spanning S3), as described above in connection with FIG. 1. In a velocity change section 406, signals of an electrode 402 may have a different velocity relative to a first modulation section and/or a second modulation section of the electrode 402, as described above in connection with FIG. 1.

As shown in FIG. 4, a first section (associated with section S1) and a second section (associated with section S3) of a waveguide 404 may be configured to have opposite modulation polarities based on an association with a first modulation section and a second modulation section of the electrodes 402. In some implementations, the opposite modulation polarities may be based on the first section and the second section being disposed between semiconductor structures of different material structures.

Figure 5:
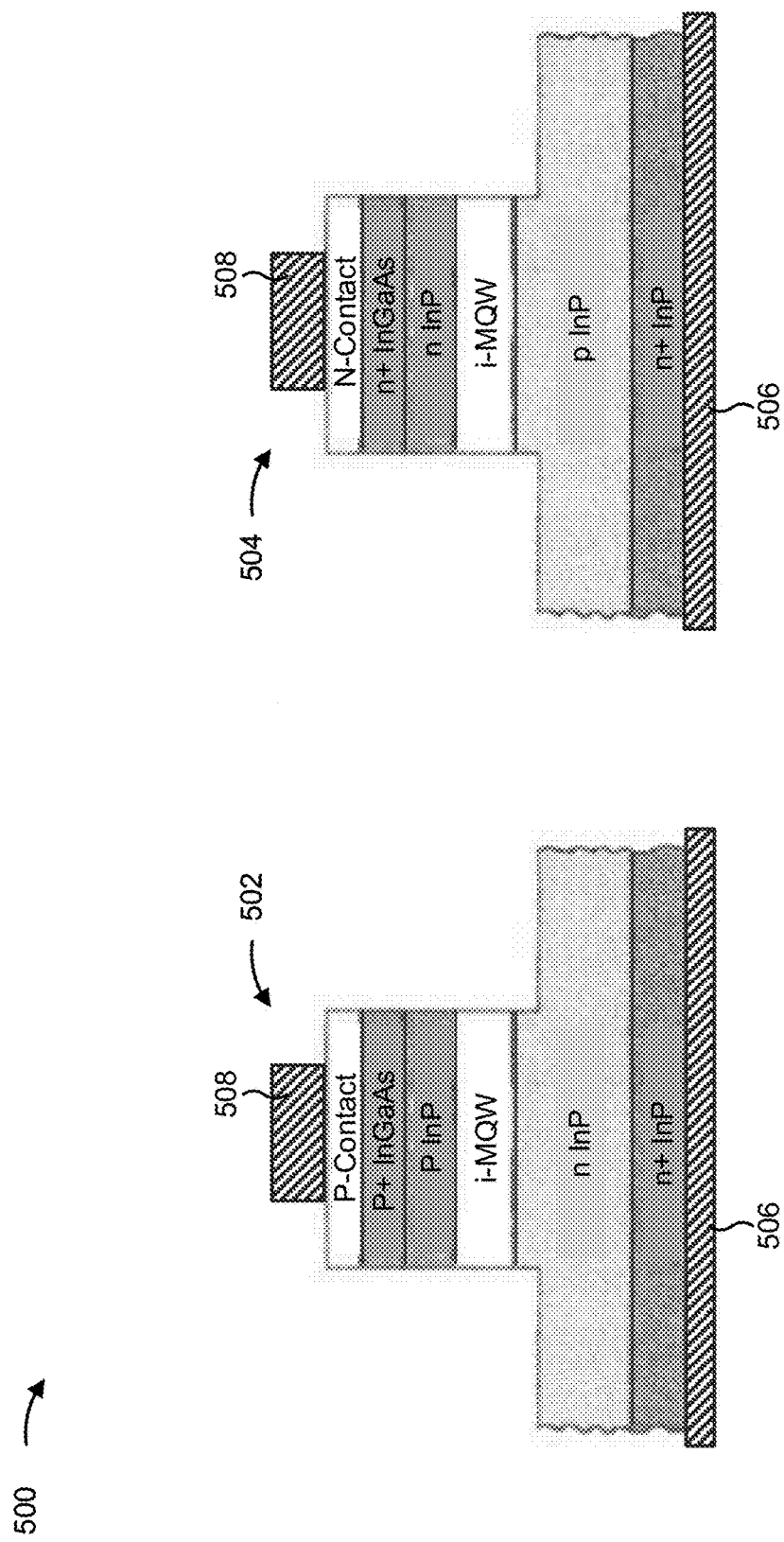
FIG. 5 is a diagram of example semiconductor structures.

For example, in the first section S1, a first section of the first waveguide 404a may be disposed in a first semiconductor structure 502 (as shown in FIG. 5) configured for a first modulation polarity, and in the third section S3, a second section of the first waveguide 404a may be disposed in a second semiconductor structure 504 (as shown in FIG. 5) configured for a second modulation polarity that is opposite to the first modulation polarity. Similarly, in the first section S1, a first section of the second waveguide 404b may be disposed in a first semiconductor structure, and in the third section S3, a second section of the second waveguide 404b may be disposed in a second semiconductor structure.

As indicated above, FIG. 4 is provided merely as an example. Other examples may differ from what is described with regard to FIG. 4.

In this way, lengths and/or modulation polarities of the modulation sections and/or the velocity change sections may be tailored (e.g., using a model of frequency response) to target a particular frequency response. Furthermore, using multiple modulation sections and/or velocity change sections enables tailoring of a shape of an electrical-optical frequency response to further target a particular frequency response bandwidth and/or shape. For example, the frequency response shape may be tailored to be complementary to a shape of a particular electrical driver.

FIG. 5 is a diagram of an example 500 of semiconductor structures. In particular, as shown in FIG. 5, a first semiconductor structure 502 may be different (e.g., have a different material structure, such as different layers) than a second semiconductor structure 504. For example, the first semiconductor structure 502 may have a p-i-n semiconductor structure, and the second semiconductor structure 504 may have an n-i-p semiconductor structure. In this way, the first semiconductor structure 502 and the second semiconductor structure 504 may provide opposite modulation polarities to sections of an optical waveguide, as described above.

As shown in FIG. 5, the semiconductor structure 502 and the semiconductor structure 504 may be disposed between a ground electrode 506 and a loading line 508 of a signal electrode, as described above. The semiconductor structure 502 may include, from the ground electrode 506, an n+ type semiconductor layer (e.g., n+ type InP layer), an n-type semiconductor region (e.g., n-type InP region), an intrinsic homogeneous or layered multiple quantum well (i-MQW) region, a p-type semiconductor region (e.g., p-type InP region), a p+ type semiconductor region (e.g., p+ type indium gallium arsenide (InGaAs) region), and a p-type semiconductor contact.

As shown in FIG. 5, the semiconductor structure 504 may include, from the ground electrode 506, an n+ type semiconductor layer (e.g., n+ type InP layer), a p-type semiconductor region (e.g., p-type InP region), a homogeneous or layered i-MQW region, an n-type semiconductor region (e.g., n-type InP region), an n+ type semiconductor region (e.g., n+ type InGaAs region), and an n-type semiconductor contact.

Ground electrodes 506 in semiconductor structures 502 and 504 may be direct current (DC)-isolated from each other, yet have low RF impedance to RF ground, using capacitive and inductor circuits, to allow for independent reverse biasing of the PN junctions in 502 and 504. In some implementations, if the frequency response is dependent on a magnitude of reverse bias, the overall equalized frequency response may be tuned by statically or dynamically tuning the magnitudes of reverse bias voltages.

As indicated above, FIG. 5 is provided merely as an example. Other examples may differ from what is described with regard to FIG. 5.

Figure 6A:
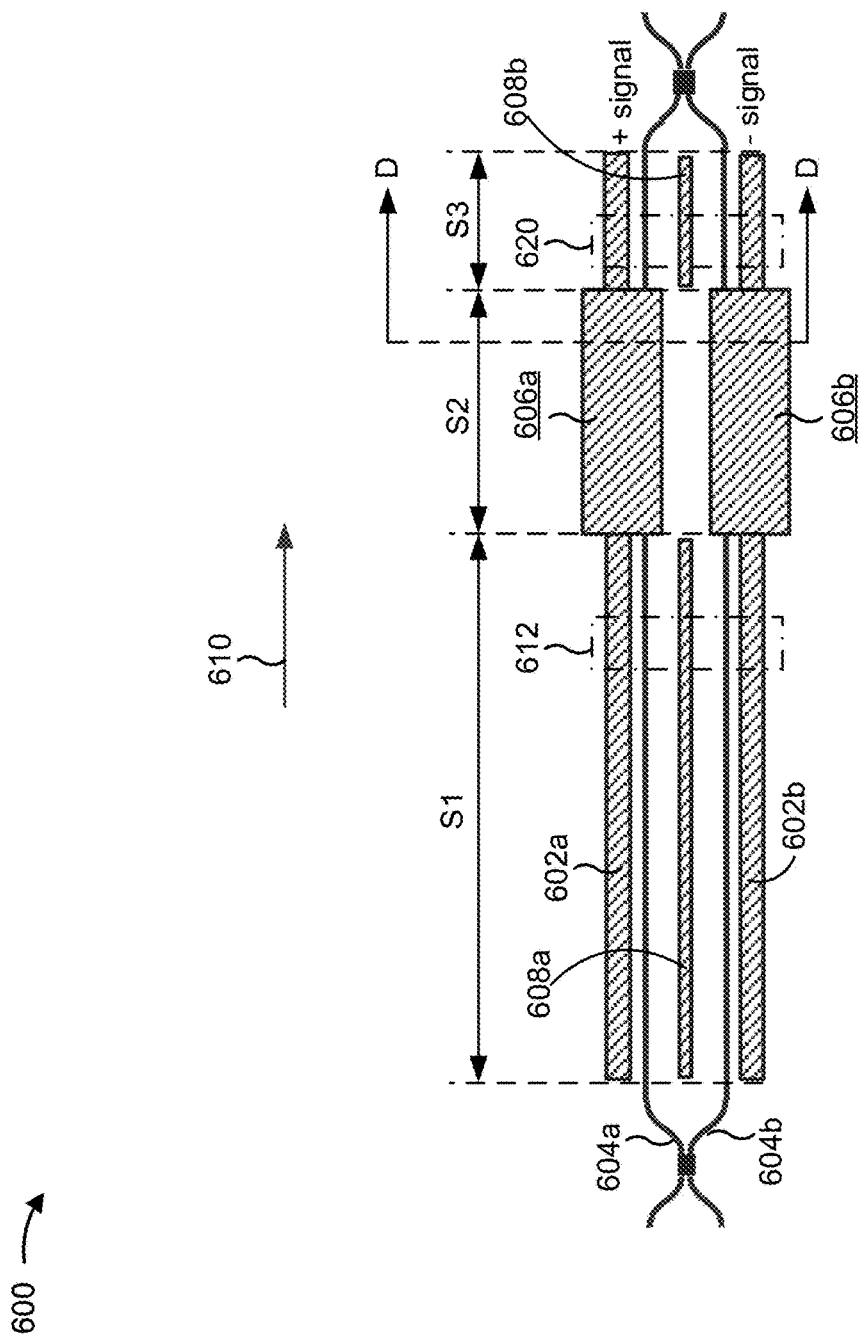
FIG. 6A is a diagram of an example electrical-optical modulator described herein.

FIG. 6A is a diagram of an example electrical-optical modulator 600 described herein. In some implementations, the electrical-optical modulator 600 may employ silicon photonics. As shown in FIG. 6A, electrical-optical modulator 600 may include a first signal electrode 602a (+ signal), a second signal electrode 602b (− signal), a first optical waveguide 604a, and a second optical waveguide 604b. Electrical signals of the signal electrodes 602 may interact with optical signals of the waveguides 604 based on a proximity between the signal electrodes 602 and the waveguides 604. For example, electrical signals of the first signal electrode 602a may interact with optical signals of the first waveguide 604a, and electrical signals of the second signal electrode 602b may interact with optical signals of the second waveguide 604b. The signal electrodes 602 may be configured to propagate an electrical signal in a direction of propagation 610 of the electrical-optical modulator 600, and the waveguides 604 may be configured to propagate an optical signal in the direction of propagation 610.

As shown in FIG. 6A, the electrical-optical modulator 600 may include a first bias electrode 608a in section S1, and a second bias electrode 608b in section S3. The first bias electrode 608a may be between the first waveguide 604a and the second waveguide 604b in section S1, and the second bias electrode 608b may be between the first waveguide 604a and the second waveguide 604b in section S3. The first waveguide 604a and the second waveguide 604b may be between the first signal electrode 602a and the second signal electrode 602b.

The first bias electrode 608a and the second bias electrode 608b may be isolated (e.g., electrically isolated) from each other. For example, the first bias electrode 608a may provide a first bias voltage (e.g., a first direct current (DC) voltage), and the second bias electrode 608b may provide a second bias voltage (e.g., a second DC voltage). In some implementations, the first bias voltage and the second bias voltage may have opposite polarities. In some implementations, the first bias voltage and the second bias voltage may have the same magnitude (e.g., with opposite polarities) or may be different (e.g., the first bias voltage and the second bias voltage may be tuned). The first bias electrode 608a may provide reverse biasing for one or more first semiconductor junctions in section S1, as described below, and the second bias electrode 608b may provide reverse biasing for one or more second semiconductor junctions in section S2, as described below.

As shown in FIG. 6A, the first signal electrode 602a may include a first modulation section (spanning S1), a velocity change section 606a (spanning S2), and a second modulation section (spanning S3). Similarly, the second signal electrode 602b may include a first modulation section (spanning S1), a velocity change section 606b (spanning S2), and a second modulation section (spanning S3). In a velocity change section 606, signals of a signal electrode 602 may have a different velocity relative to a first modulation section and/or a second modulation section of the signal electrode 602, as described above in connection with FIG. 1.

A first section (associated with section S1) and a second section (associated with section S3) of a waveguide 604 may be configured to have opposite modulation polarities based on an association with a first modulation section and a second modulation section of the signal electrodes 602. That is, section S1 and section S3 of the electrical-optical modulator 600 may have opposite modulation polarities. In some implementations, the opposite modulation polarities are based on a semiconductor structure associated with section S1 having a reversed orientation relative to a semiconductor structure associated with section S3, as described below.

In some implementations, portions of the waveguides 604 in section S1 and section S3 of the electrical-optical modulator 600 may be rib-type waveguides (shown in FIGS. 6C, 6E, 6F, 6I, 6K, and 6L). Additionally, or alternatively, portions of the waveguides 604 in section S2 of the electrical-optical modulator 600 may be strip-type waveguides (shown in FIG. 6G). In other words, the waveguides 604 may be tapered waveguides that transition from a rib waveguide (e.g., a ridge waveguide) to a strip waveguide at a first portion (e.g., at a transition from section S1 to section S2), and transition from a strip waveguide to a rib waveguide at a second portion (e.g., at a transition from section S2 to section S3).

In this way, the electrical-optical modulator 600 may include a first section configured for a first electrical-optical interaction between at least one optical waveguide and at least one signal electrode, a second section configured to increase or decrease a velocity of signals of the at least one signal electrode or the at least one optical waveguide relative to the first section, and a third section configured for a second electrical-optical interaction between the at least one optical waveguide and the at least one signal electrode according to an opposite modulation polarity relative to the first section. The first section may include a first semiconductor junction in the at least one optical waveguide according to a first semiconductor-type ordering, and a first bias electrode to provide reverse biasing to the first semiconductor junction. The third section may include a second semiconductor junction in the at least one optical waveguide according to a second semiconductor-type ordering that is opposite to the first semiconductor-type ordering, and a second bias electrode to provide reverse biasing to the second semiconductor junction. The first semiconductor junction and the second semiconductor junction may be planar (e.g., the semiconductor junctions are lateral, rather than stacked, as described in connection with FIG. 5). In addition, in some aspects, the at least one optical waveguide does not include a semiconductor junction in the second section.

As indicated above, FIG. 6A is provided as an example. Other examples may differ from what is described with regard to FIG. 6A.

Figure 6B:
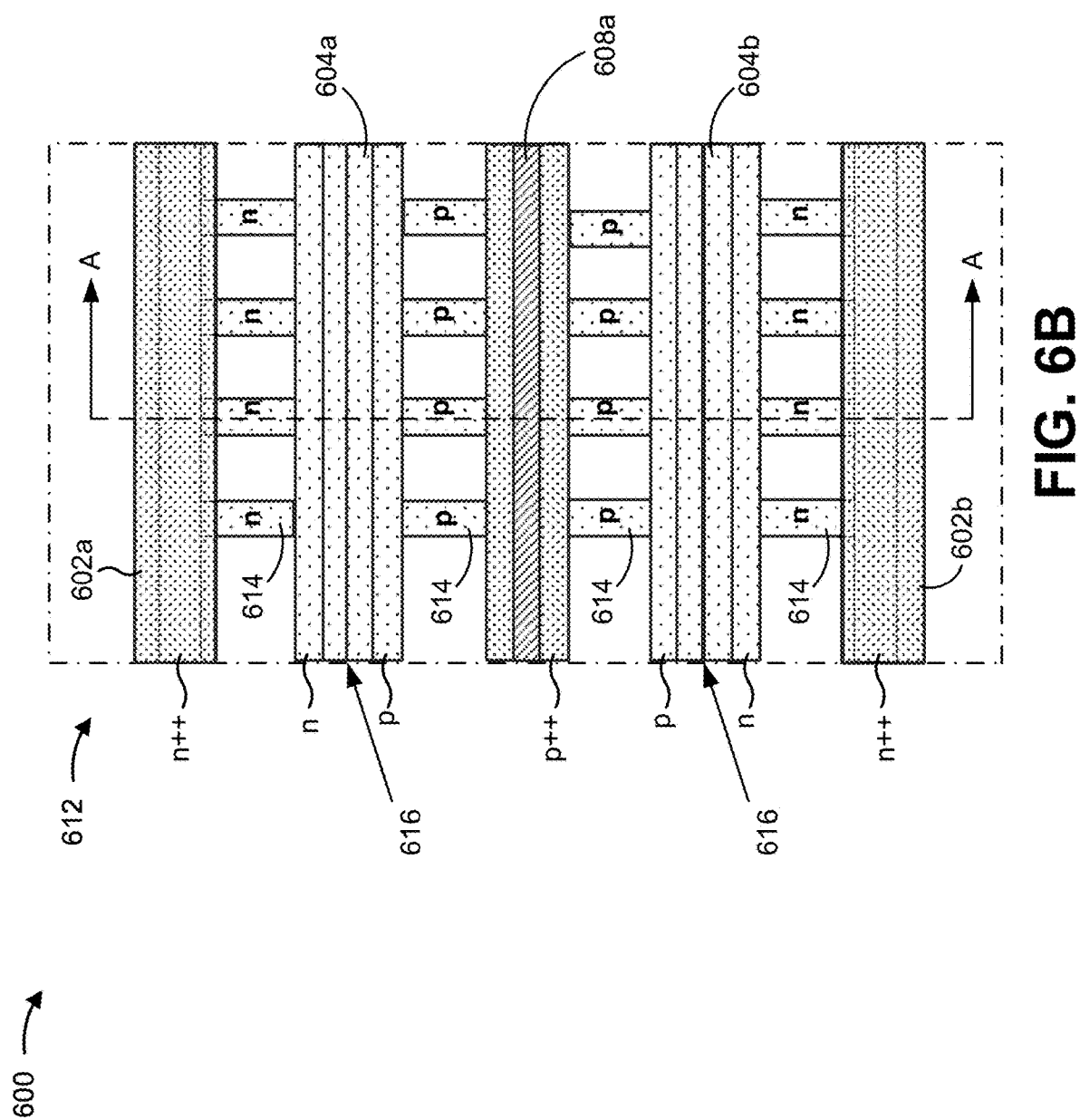
FIG. 6B is a diagram of an enlarged detail view of the electrical-optical modulator of FIG. 6A.

FIG. 6B is a diagram of an enlarged detail view of the electrical-optical modulator 600 of FIG. 6A. In particular, FIG. 6B shows one embodiment of an enlarged detail view of a portion 612 in section S1 of the electrical-optical modulator 600. Section S1 of the electrical-optical modulator 600 may include a layer of semiconductor material. For example, the semiconductor material may be silicon. The semiconductor layer may include segmented semiconductor portions, shown as multiple semiconductor bridges 614, that connect sections of the semiconductor layer. In some implementations, the semiconductor layer may include continuous connecting portions rather than bridges 614.

In some implementations, the semiconductor layer may include one or more first semiconductor junctions 616 in section S1 of the electrical-optical modulator 600. For example, a semiconductor junction 616 may be in the first waveguide 604a, and a semiconductor junction 616 may be in the second waveguide 604b. A semiconductor junction may refer to a region of a first semiconductor type (e.g., n-type) that is adjacent to a region of a second semiconductor type (e.g., p-type). The first bias voltage of the first bias electrode 608a may provide reverse biasing to the semiconductor junctions 616 in section S1.

As indicated above, FIG. 6B is provided as an example. Other examples may differ from what is described with regard to FIG. 6B.

Figure 6C:
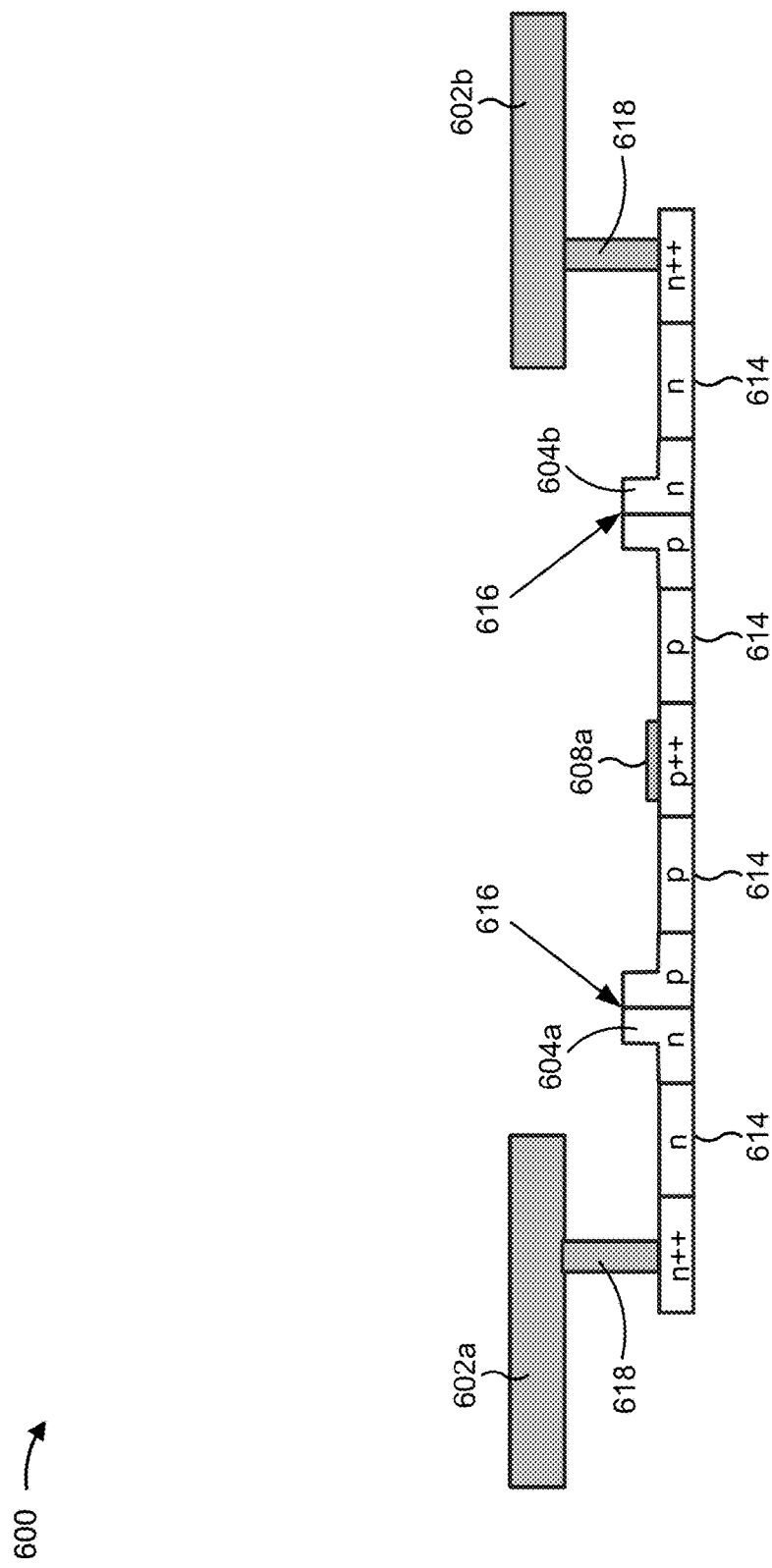
FIG. 6C is a cross-sectional view taken along line A-A of the enlarged detail view of FIG. 6B.

FIG. 6C is a cross-sectional view taken along line A-A of the enlarged detail view of the electrical-optical modulator 600 of FIG. 6B. In some implementations, the electrical-optical modulator 600 may include one or more additional layers (e.g., a substrate layer, oxide layers, metal layers, and/or the like) above and/or below the semiconductor layer, which are not shown in the cross-section for simplicity.

As shown in FIG. 6C, the first signal electrode 602a may connect (e.g., electrically connect) to the semiconductor layer by a connector 618 (e.g., a metal via), and the second signal electrode 602b may connect to the semiconductor layer by a connector 618. In section S1, the first signal electrode 602a and the second signal electrode 602b may be connected (e.g., electrically connected) to respective connection regions of the semiconductor layer having the first semiconductor type (e.g., n++), and the first bias electrode 608a may be connected (e.g., electrically connected) to a connection region of the semiconductor layer having the second semiconductor type (e.g., p++).

The semiconductor layer may extend laterally across a width of the electrical-optical modulator 600 (e.g., orthogonal to the direction of propagation 610). For example, the semiconductor layer may extend laterally (e.g., horizontally) from the first signal electrode 602a to the second signal electrode 602b. In section S1, the semiconductor layer may have a first semiconductor-type ordering. The first semiconductor-type ordering may include one or more regions of the second type of semiconductor (e.g., p-type) between regions of the first type of semiconductor (e.g., n-type).

For example, in section S1, a portion of the semiconductor layer, between the connections of the first signal electrode 602a and the first bias electrode 608a, may have an n-type semiconductor region adjacent to a p-type semiconductor region, and a portion of the semiconductor layer, between the connections of the first bias electrode 608a and the second signal electrode 602b, may have a p-type semiconductor region adjacent to an n-type semiconductor region (e.g., sequentially from the first signal electrode 602a to the second signal electrode 602b). Accordingly, in section S1, the semiconductor junction 616 in the first waveguide 604a may be an NP junction, and the semiconductor junction 616 in the second waveguide may be a PN junction. In other words, a lateral NP-PN series push-pull junction region may be between the first signal electrode 602a and the second signal electrode 602b. The semiconductor junctions 616 in the first waveguide 604a and the second waveguide 604b may extend parallel to the direction of propagation 610.

As indicated above, FIG. 6C is provided as an example. Other examples may differ from what is described with regard to FIG. 6C.

Figure 6D:
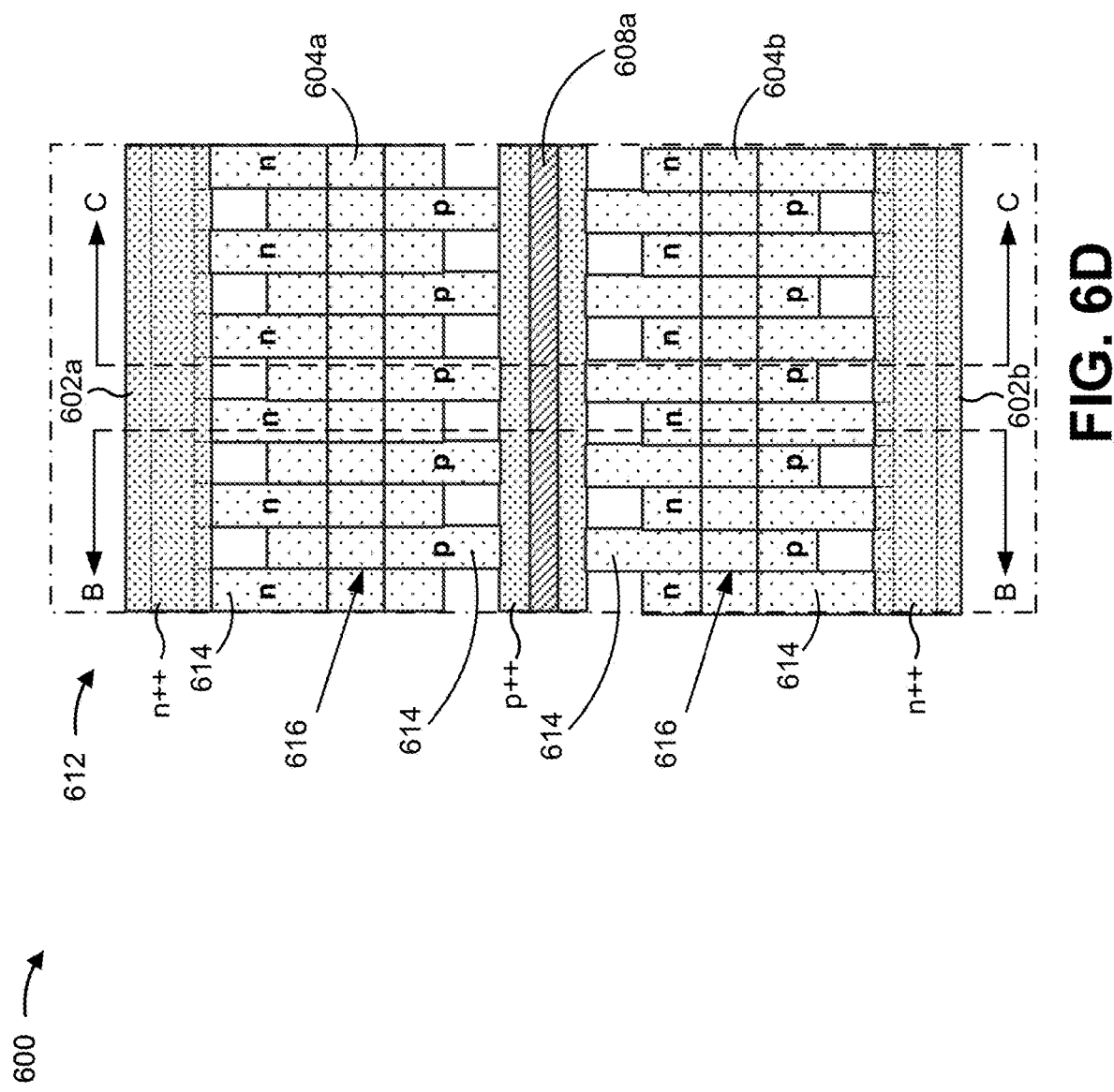
FIG. 6D is a diagram of an enlarged detail view of the electrical-optical modulator of FIG. 6A.

FIG. 6D is a diagram of an enlarged detail view of the electrical-optical modulator 600 of FIG. 6A. In particular, FIG. 6D shows another embodiment of an enlarged detail view of the portion 612 in section S1 of the electrical-optical modulator 600 (e.g., additionally, or alternatively, to the embodiment shown in FIG. 6B). Section S1 of the electrical-optical modulator 600 may include a layer of semiconductor material, as described above in connection with FIG. 6B.

The semiconductor layer may include multiple semiconductor bridges 614 that connect sections of the semiconductor layer, as described in connection with FIG. 6B. As shown in FIG. 6D, a bridge 614 may extend partially between sections of the semiconductor layer, as described below in connection with FIGS. 6E and 6F. However, the bridges 614 may be interdigitated to connect the sections of the semiconductor layer. For example, between the first signal electrode 602a and the first bias electrode 608a, a first set of bridges 614 may be interdigitated, and between the first bias electrode 608a and the second signal electrode 602b, a second set of bridges 614 may be interdigitated.

Moreover, in section S1, interdigitation of the bridges 614 may alternate between semiconductor types according to a first semiconductor-type ordering. For example, in section S1, the first semiconductor-type ordering may begin with, and end with, the first semiconductor type (e.g., n-type). For example, a first bridge 614 may be an n-type semiconductor, a second bridge 614 may be a p-type semiconductor, a third bridge 614 may be an n-type semiconductor, a fourth bridge 614 may be a p-type semiconductor, and so forth, and a last bridge may be an n-type semiconductor.

In some implementations, the semiconductor layer may include one or more first semiconductor junctions 616 in section S1 of the electrical-optical modulator 600. For example, one or more semiconductor junctions 616 may be in the first waveguide 604a, and one or more semiconductor junctions 616 may be in the second waveguide 604b. As shown in FIG. 6D, a semiconductor junction 616 may occur at a region of adjacency between alternating bridges 614 of the first semiconductor type and the second semiconductor type. Accordingly, the semiconductor junctions 616 may be orthogonal to the direction of propagation 610. The first bias voltage of the first bias electrode 608a may provide reverse biasing to the semiconductor junctions 616 in section S1.

As indicated above, FIG. 6D is provided as an example. Other examples may differ from what is described with regard to FIG. 6D.

Figure 6E:
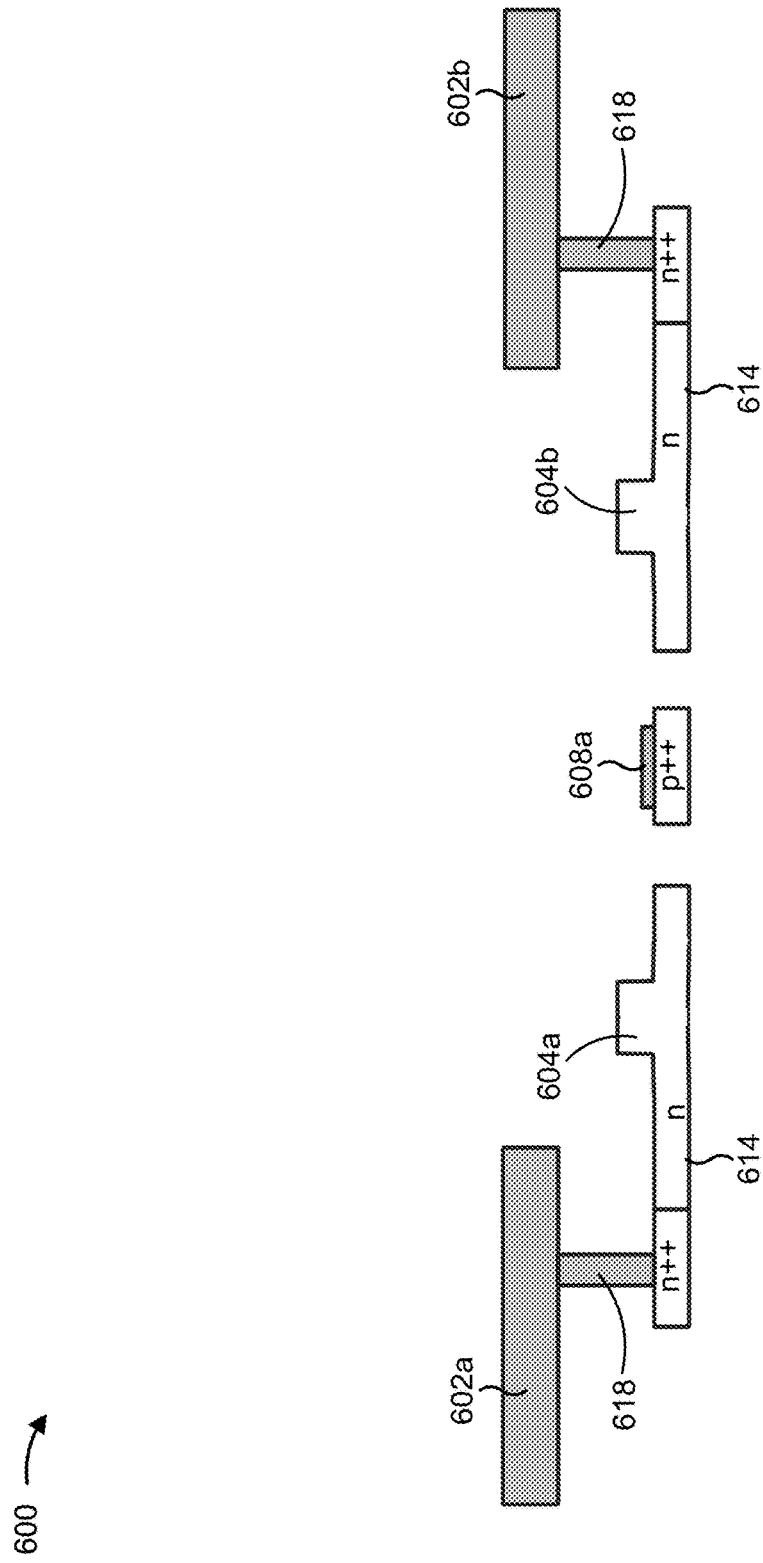
FIG. 6E is a cross-sectional view taken along line B-B of the enlarged detail view of FIG. 6D.

FIG. 6E is a cross-sectional view taken along line B-B of the enlarged detail view of the electrical-optical modulator 600 of FIG. 6D. In some implementations, the electrical-optical modulator 600 may include one or more additional layers (e.g., a substrate layer, oxide layers, metal layers, and/or the like) above and/or below the semiconductor layer, which are not shown in the cross-section for simplicity.

As shown in FIG. 6E, the first signal electrode 602a may connect to the semiconductor layer by a connector 618, and the second signal electrode 602b may connect to the semiconductor layer by a connector 618, as described above. In section S1, the first signal electrode 602a and the second signal electrode 602b may be connected (e.g., electrically connected) to respective connection regions of the semiconductor layer having the first semiconductor type (e.g., n++), and the first bias electrode 608a may be connected (e.g., electrically connected) to a connection region of the semiconductor layer having the second semiconductor type (e.g., p++). As shown in FIG. 6E, a bridge 614 of the first semiconductor type may extend from a connection region of the first semiconductor type (e.g., associated with a signal electrode 602), and partially toward a connection region of the second semiconductor type (e.g., associated with the first bias electrode 608a). For example, a bridge 614 that is an n-type semiconductor may extend from an n++ connection region, and partially toward a p++ connection region.

As indicated above, FIG. 6E is provided as an example. Other examples may differ from what is described with regard to FIG. 6E.

Figure 6F:
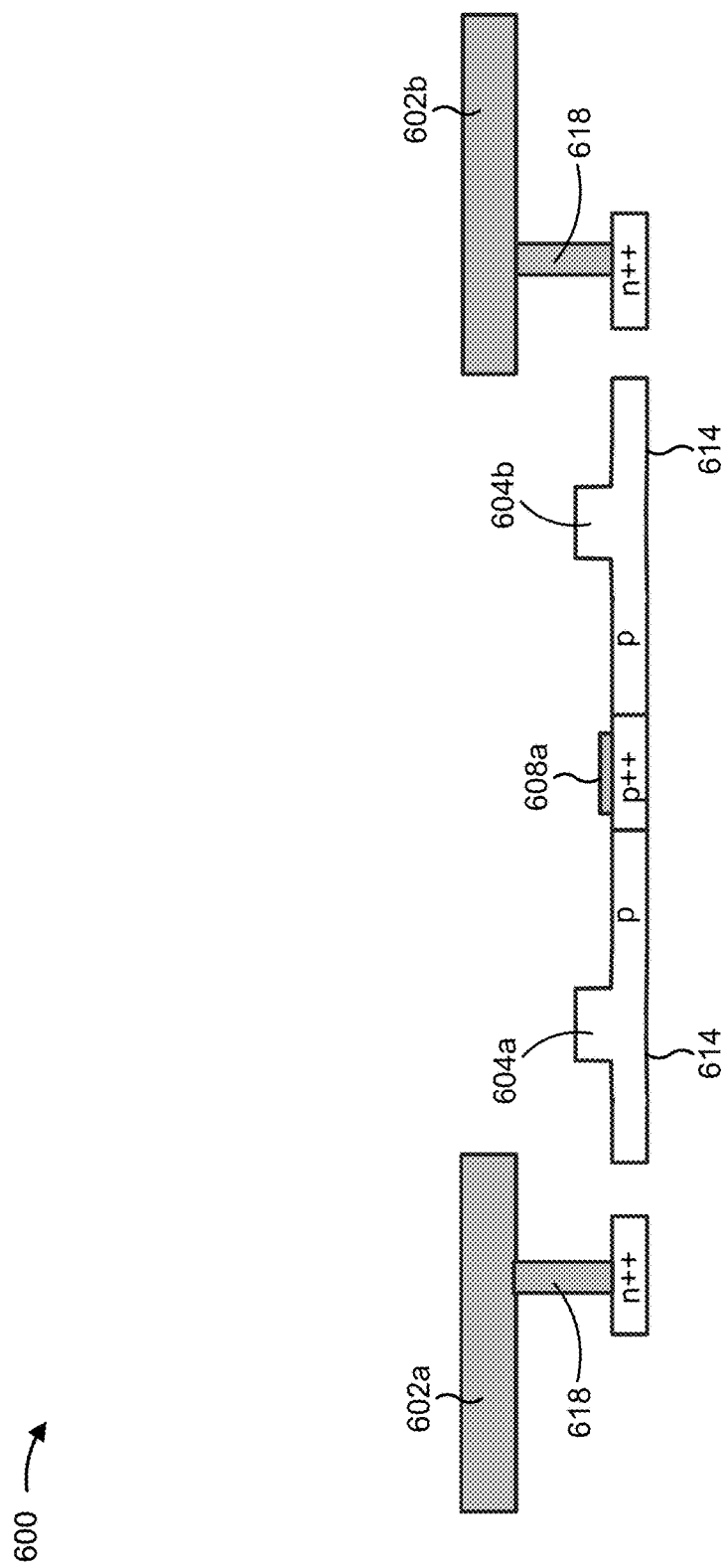
FIG. 6F is a cross-sectional view taken along line C-C of the enlarged detail view of FIG. 6D.

FIG. 6F is a cross-sectional view taken along line C-C of the enlarged detail view of the electrical-optical modulator 600 of FIG. 6D. In some implementations, the electrical-optical modulator 600 may include one or more additional layers (e.g., a substrate layer, oxide layers, metal layers, and/or the like) above and/or below the semiconductor layer, which are not shown in the cross-section for simplicity.

As shown in FIG. 6F, a bridge 614 of the second semiconductor type may extend from a connection region of the second semiconductor type, and partially toward a connection region of the first semiconductor type. For example, a bridge 614 that is a p-type semiconductor may extend from a p++ connection region (e.g., associated with the first bias electrode 608a), and partially toward an n++ connection region (e.g., associated with a signal electrode 602).

As indicated above, FIG. 6F is provided as an example. Other examples may differ from what is described with regard to FIG. 6F.

Figure 6G:
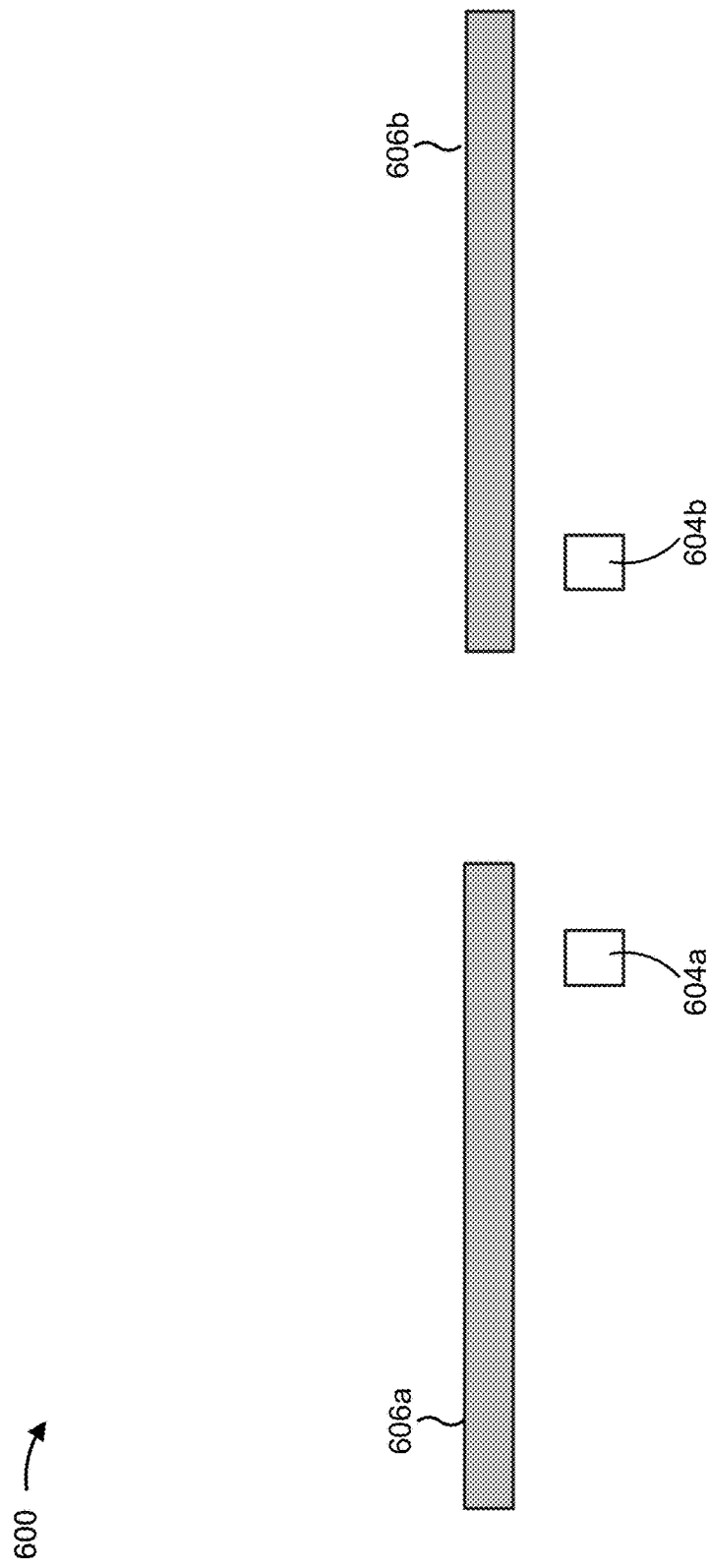
FIG. 6G is a cross-sectional view taken along line D-D of the electrical-optical modulator of FIG. 6A.

FIG. 6G is a cross-sectional view taken along line D-D of the electrical-optical modulator 600 of FIG. 6A. In some implementations, the electrical-optical modulator 600 may include one or more additional layers (e.g., a substrate layer, oxide layers, metal layers, and/or the like) above and/or below the semiconductor layer, which are not shown in the cross-section for simplicity.

As shown in FIG. 6G, in section S2, the signal electrode 602a may include the velocity change section 606a, and the signal electrode 602b may include the velocity change section 606b. For example, in section S2, the signal electrodes 602 may be wider relative to section S1 and section S3 and/or the signal electrodes 602 may be separated by a narrower gap relative to section S1 and section S3. Moreover, in section S2, the semiconductor layer may be etched to include the waveguides 604 without surrounding semiconductor material. In addition, in section S2, the waveguides 604 do not include a semiconductor junction. For example, in section S2, the first waveguide 604a may include a first continuous undoped semiconductor region (e.g., a silicon-on-insulator region), and the second waveguide 604b may include a second continuous undoped semiconductor region.

In section S2, an RF impedance of the signal electrodes 602 may correspond to (e.g., be the same as, be within a particular range as, and/or the like) an RF impedance of the signal electrodes 602 in section S1 (e.g., based on the signal electrodes 602 having a different width and/or gap in section S2 relative to section S1). Moreover, removal of the semiconductor junctions in section S2 may reduce a microwave index in section S2 relative to section S1 (similar to the removal of loading lines, as described above). In addition, RF and optical indices may correspond (e.g., be the same, be within a particular range, and/or the like) in section S1 and section S3 in order to increase intrinsic bandwidth in section S1 and section S3, thereby requiring less electrical-optical equalization (e.g., compared to when RF and optical indices do not correspond) in order to achieve a target bandwidth of the electrical-optical modulator 600. Thus, the electrode geometry (e.g., electrode widths, gaps between electrodes, electrode thicknesses, and/or the like) may be configured to provide microwave and optical indices that differ by a threshold value.

In some implementations, section S2 may include an optical delay (e.g., in addition to, or instead of, wider signal electrodes 606). For example, the waveguides 604 may include path-length delays in section S2 (e.g., as shown in sections S1 and S3 of FIG. 9, or another path-length delay configuration). In other words, path lengths of the waveguides 604 in section S2 may be greater than path lengths of the signal electrodes 606 in section S2. Accordingly, the waveguides 604 may take a circuitous path, such that respective path lengths of the waveguides 604 in section S2 are greater than a length of S2.

As indicated above, FIG. 6G is provided as an example. Other examples may differ from what is described with regard to FIG. 6G.

Figure 6H:
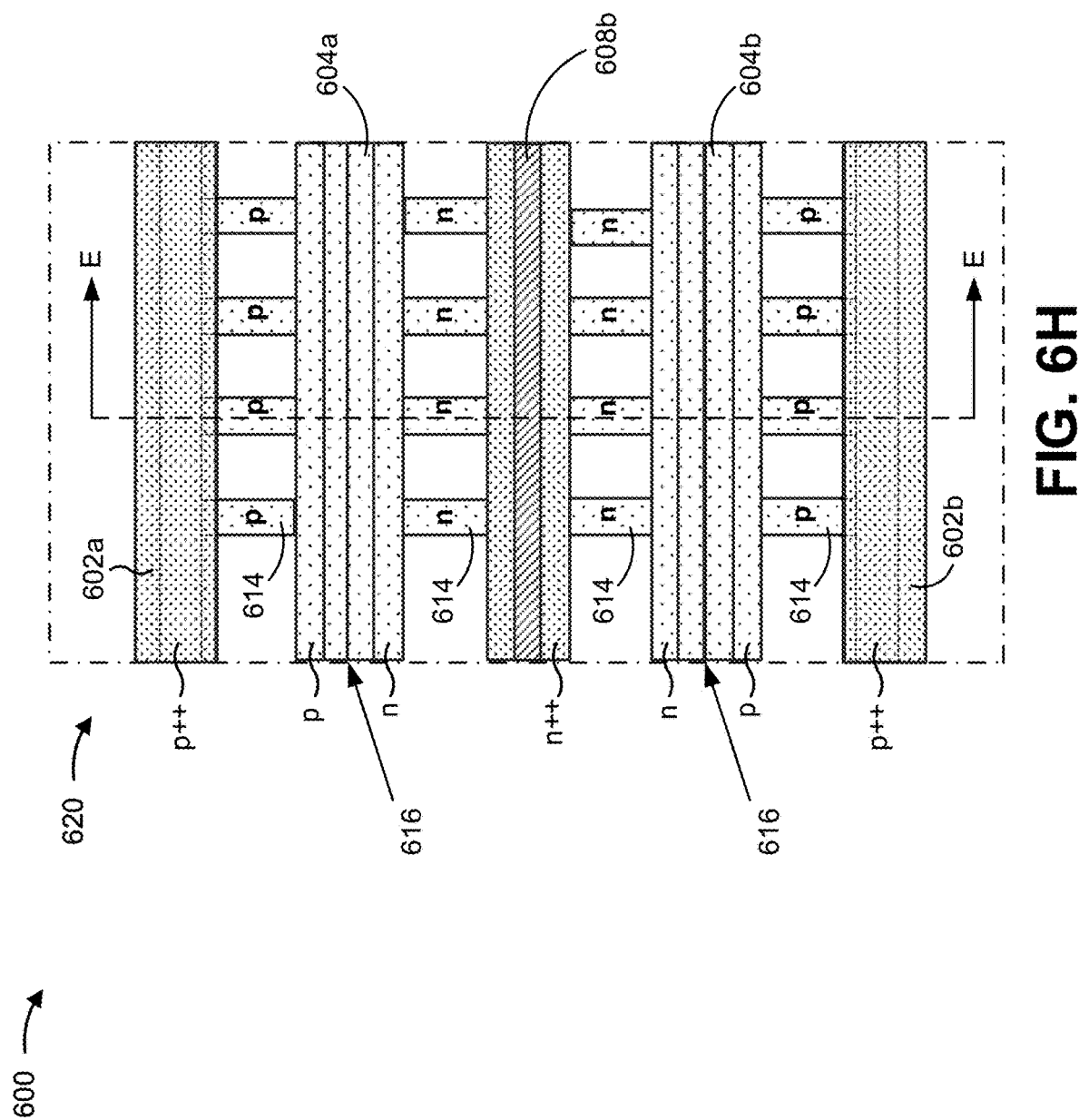
FIG. 6H is a diagram of an enlarged detail view of the electrical-optical modulator of FIG. 6A.

FIG. 6H is a diagram of an enlarged detail view of the electrical-optical modulator 600 of FIG. 6A. In particular, FIG. 6H shows one embodiment of an enlarged detail view of a portion 620 in section S3 of the electrical-optical modulator 600. Section S3 of the electrical-optical modulator 600 may include the layer of semiconductor material, and multiple semiconductor bridges 614 may connect sections of the semiconductor layer, as described in connection with FIG. 6B.

In some implementations, the semiconductor layer may include one or more second semiconductor junctions 616 in section S3 of the electrical-optical modulator 600. For example, a semiconductor junction 616 may be in the first waveguide 604a, and a semiconductor junction 616 may be in the second waveguide 604b. The second semiconductor junctions 616 in section S3 may be reversed (e.g., reversed polarity) relative to the first semiconductor junctions 616 in section S1 (described in FIGS. 6B and 6C). That is, a second semiconductor-type ordering in section S3 may be reversed relative to the first semiconductor-type ordering in section S1 (described in FIG. 6C). The second bias voltage of the second bias electrode 608b may provide reverse biasing to the semiconductor junctions 616 in section S3.

As indicated above, FIG. 6H is provided as an example. Other examples may differ from what is described with regard to FIG. 6H.

Figure 6I:
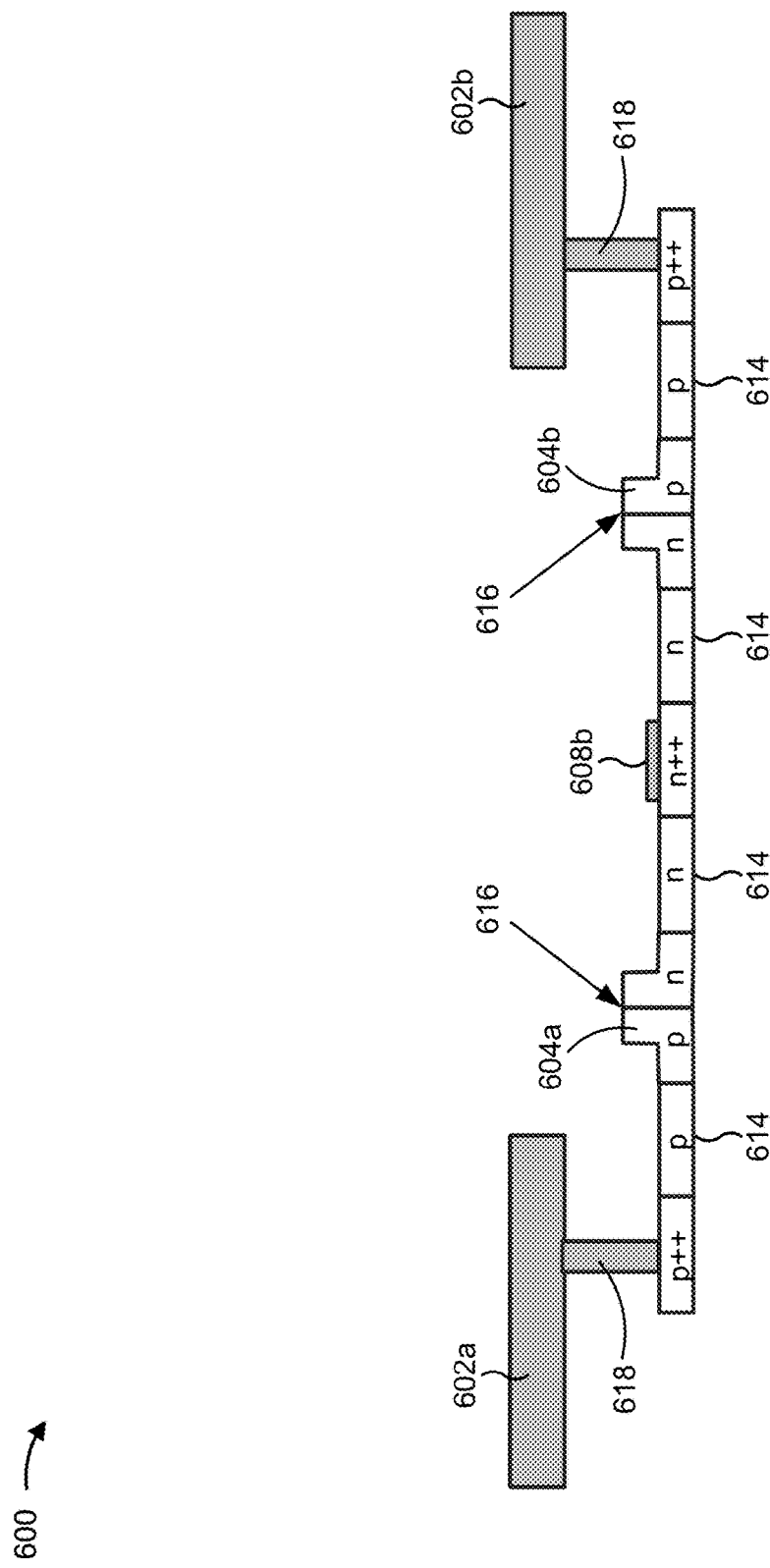
FIG. 6I is a cross-sectional view taken along line E-E of the enlarged detail view of FIG. 6H.

FIG. 6I is a cross-sectional view taken along line E-E of the enlarged detail view of the electrical-optical modulator 600 of FIG. 6H. In some implementations, the electrical-optical modulator 600 may include one or more additional layers (e.g., a substrate layer, oxide layers, metal layers, and/or the like) above and/or below the semiconductor layer, which are not shown in the cross-section for simplicity.

As shown in FIG. 6I, the first signal electrode 602a may connect to the semiconductor layer by a connector 618, and the second signal electrode 602b may connect to the semiconductor layer by a connector 618, as described above. In section S3, the first signal electrode 602a and the second signal electrode 602b may be connected (e.g., electrically connected) to respective connection regions of the semiconductor layer having the second semiconductor type (e.g., p++), and the second bias electrode 608b may be connected (e.g., electrically connected) to a connection region of the semiconductor layer having the first semiconductor type (e.g., n++).

In section S3, the semiconductor layer may have a second semiconductor-type ordering. The second semiconductor-type ordering may include one or more regions of the first type of semiconductor (e.g., n-type) between regions of the second type of semiconductor (e.g., p-type). That is, second semiconductor-type ordering may be reversed to the first semiconductor-type ordering in section S1 (described in FIG. 6C).

For example, in section S3, a portion of the semiconductor layer, between the connections of the first signal electrode 602a and the second bias electrode 608b, may have a p-type semiconductor region adjacent to an n-type semiconductor region, and a portion of the semiconductor layer, between the connections of the second bias electrode 608b and the second signal electrode 602b, may have an n-type semiconductor region adjacent to a p-type semiconductor region (e.g., sequentially from the first signal electrode 602a to the second signal electrode 602b). Accordingly, in section S3, the semiconductor junction 616 in the first waveguide 604a may be a PN junction, and the semiconductor junction 616 in the second waveguide may be an NP junction. In other words, a lateral PN-NP series push-pull junction region may be between the first signal electrode 602a and the second signal electrode 602b.

As indicated above, FIG. 6I is provided as an example. Other examples may differ from what is described with regard to FIG. 6I.

FIG. 6J is a diagram of an enlarged detail view of the electrical-optical modulator 600 of FIG. 6A. In particular, FIG. 6J shows another embodiment of an enlarged detail view of the portion 620 in section S3 of the electrical-optical modulator 600 (e.g., additionally, or alternatively, to the embodiment shown in FIG. 6H). Section S3 of the electrical-optical modulator 600 may include a layer of semiconductor material, as described above in connection with FIG. 6H.

The semiconductor layer may include multiple semiconductor bridges 614 that connect sections of the semiconductor layer, as described in connection with FIG. 6D and below in connection with FIGS. 6K and 6L. For example, between the first signal electrode 602a and the second bias electrode 608b, a first set of bridges 614 may be interdigitated, and between the second bias electrode 608b and the second signal electrode 602b, a second set of bridges 614 may be interdigitated.

Moreover, in section S3, interdigitation of the bridges 614 may alternate between semiconductor types according to a second semiconductor-type ordering. The second semiconductor-type ordering may be reversed to the first semiconductor-type ordering in section S1 (described in FIG. 6D). For example, in section S3, the second semiconductor-type ordering may begin with, and end with, the second semiconductor type (e.g., p-type). For example, a first bridge 614 may be a p-type semiconductor, a second bridge 614 may be an n-type semiconductor, a third bridge 614 may be a p-type semiconductor, a fourth bridge 614 may be an n-type semiconductor, and so forth, and a last bridge may be a p-type semiconductor.

In some implementations, the semiconductor layer may include one or more second semiconductor junctions 616 in section S3 of the electrical-optical modulator 600, as described above in connection with FIG. 6H. For example, one or more semiconductor junctions 616 may be in the first waveguide 604a, and one or more semiconductor junctions 616 may be in the second waveguide 604b, as described in connection with FIG. 6D. The second bias voltage of the second bias electrode 608b may provide reverse biasing to the semiconductor junctions 616 in section S3.

As indicated above, FIG. 6J is provided as an example. Other examples may differ from what is described with regard to FIG. 6J.

Figure 6K:
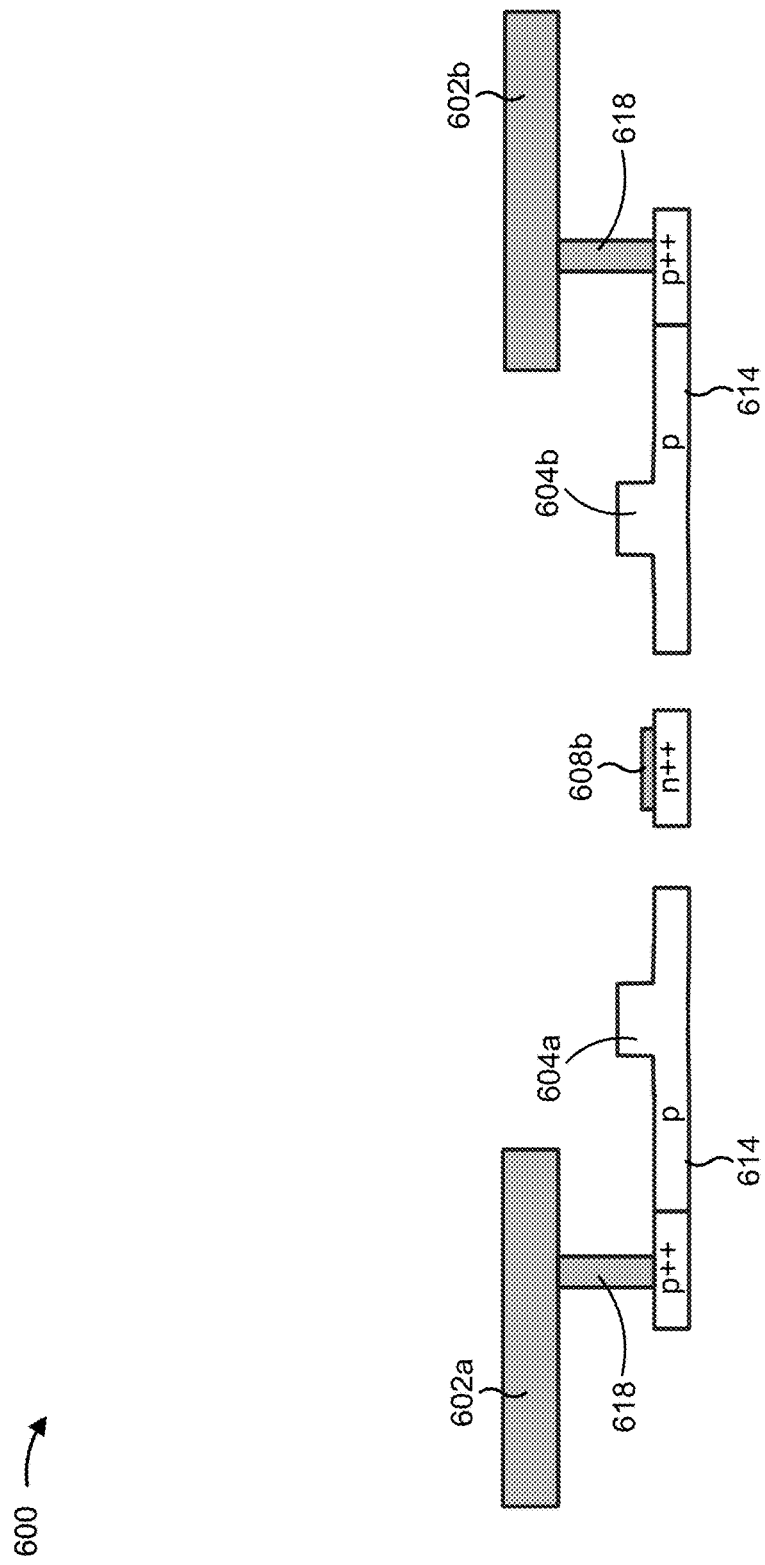
FIG. 6K is a cross-sectional view taken along line F-F of the enlarged detail view of FIG. 6J.

FIG. 6K is a cross-sectional view taken along line F-F of the enlarged detail view of the electrical-optical modulator 600 of FIG. 6J. In some implementations, the electrical-optical modulator 600 may include one or more additional layers (e.g., a substrate layer, oxide layers, metal layers, and/or the like) above and/or below the semiconductor layer, which are not shown in the cross-section for simplicity.

As shown in FIG. 6K, the first signal electrode 602a may connect to the semiconductor layer by a connector 618, and the second signal electrode 602b may connect to the semiconductor layer by a connector 618, as described above. In section S3, the first signal electrode 602a and the second signal electrode 602b may be connected (e.g., electrically connected) to respective connection regions of the semiconductor layer having the second semiconductor type (e.g., p++), and the second bias electrode 608b may be connected (e.g., electrically connected) to a connection region of the semiconductor layer having the first semiconductor conductivity type (e.g., n++). As shown in FIG. 6K, a bridge 614 of the second semiconductor type may extend from a connection region of the second semiconductor type (e.g., associated with a signal electrode 602), and partially toward a connection region of the first semiconductor type (e.g., associated with the second bias electrode 608b). For example, a bridge 614 that is a p-type semiconductor may extend from a p++ connection region, and partially toward an n++ connection region.

As indicated above, FIG. 6K is provided as an example. Other examples may differ from what is described with regard to FIG. 6K.

Figure 6L:
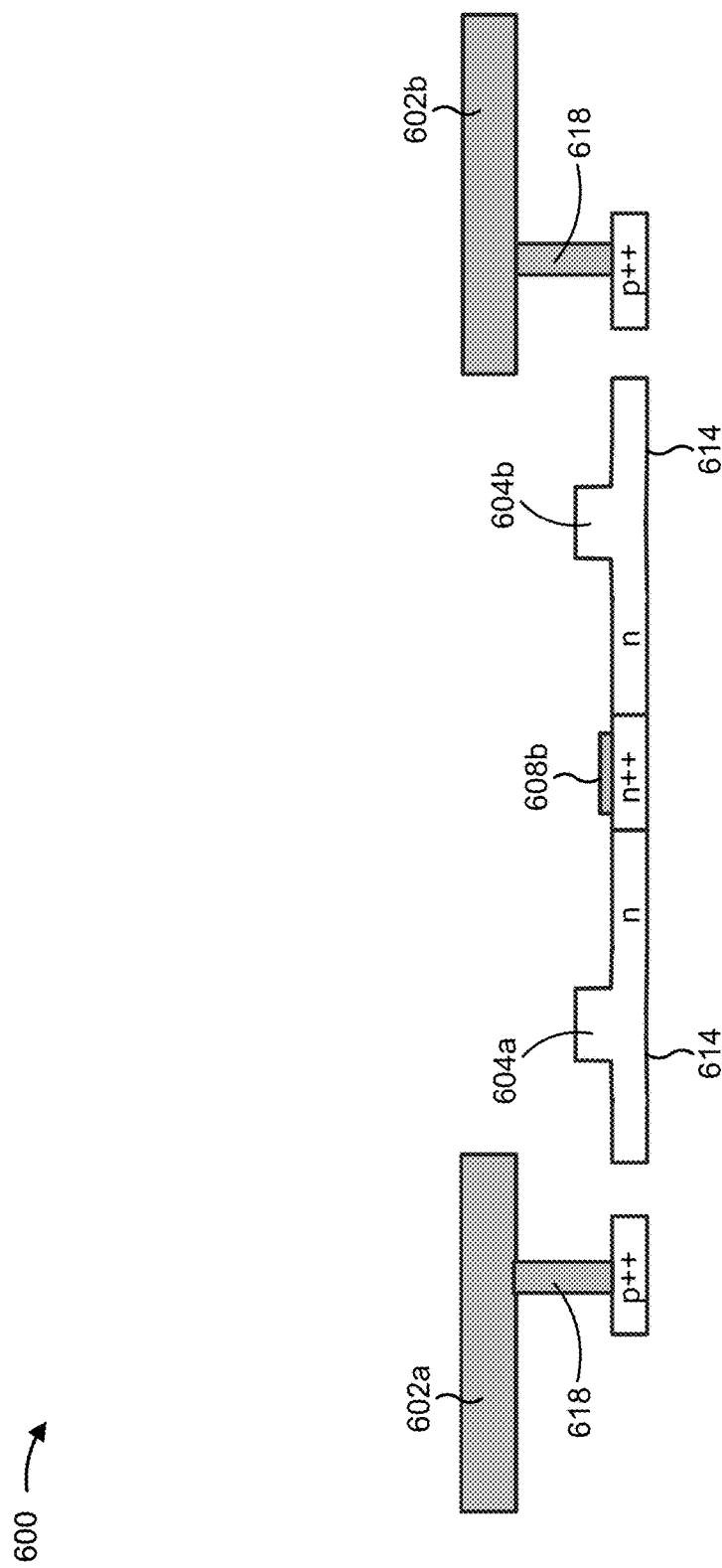
FIG. 6L is a cross-sectional view taken along line G-G of the enlarged detail view of FIG. 6J.

FIG. 6L is a cross-sectional view taken along line G-G of the enlarged detail view of the electrical-optical modulator 600 of FIG. 6J. In some implementations, the electrical-optical modulator 600 may include one or more additional layers (e.g., a substrate layer, oxide layers, metal layers, and/or the like) above and/or below the semiconductor layer, which are not shown in the cross-section for simplicity.

As shown in FIG. 6L, a bridge 614 of the first semiconductor type may extend from a connection region of the first semiconductor type, and partially toward a connection region of the second semiconductor type. For example, a bridge 614 that is an n-type semiconductor may extend from an n++ connection region (e.g., associated with the second bias electrode 608b), and partially toward a p++ connection region (e.g., associated with a signal electrode 602).

As indicated above, FIG. 6L is provided as an example. Other examples may differ from what is described with regard to FIG. 6L. While section S1 and section S3 of the electrical-optical modulator 600 are described according to an example semiconductor-type configuration, other examples may use different semiconductor-type configurations in section S1 and section S3, provided that the semiconductor-type configuration in section S1 is reversed relative to the semiconductor-type configuration in section S3. For example, in some implementations, section S1 of the electrical-optical modulator 600 may have the semiconductor-type configuration described above with respect to section S3 (i.e., in one or more of FIGS. 6H-6L), and section S3 of the electrical-optical modulator 600 may have the semiconductor-type configuration described above with respect to section S1 (i.e., in one or more of FIGS. 6B-6F).

Figure 7:
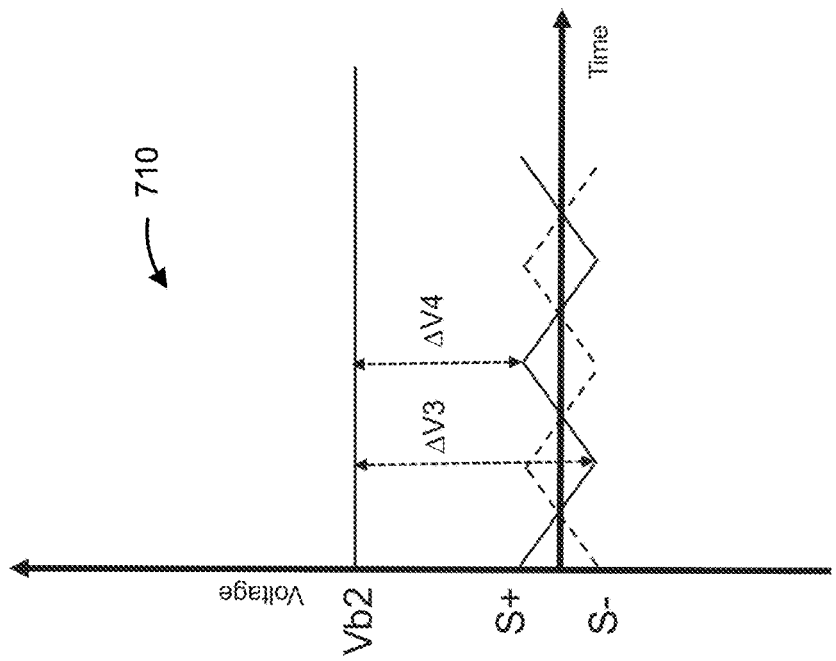
FIG. 7 is a diagram of example differential voltages used in connection with the electrical-optical modulator of FIG. 6A.
Figure 7:
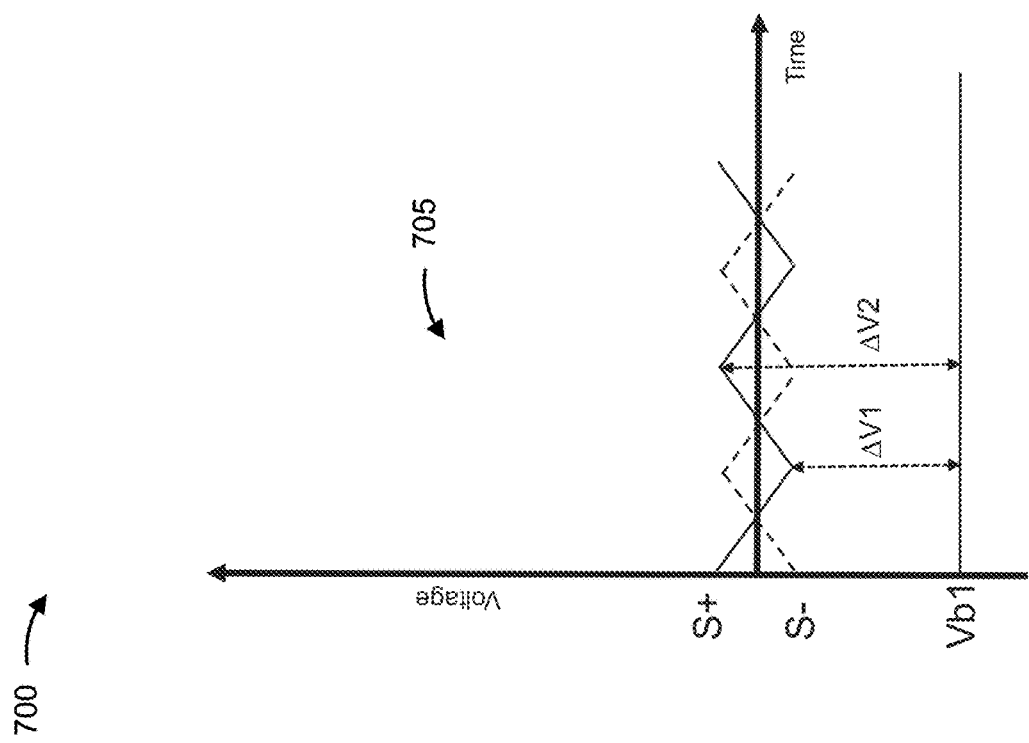

FIG. 7 shows a diagram of example differential voltages used in connection with the electrical-optical modulator 600 of FIG. 6A described herein. In particular, FIG. 7 shows a differential voltage graph 705 for section S1 of the electrical-optical modulator 600, and a differential voltage graph 710 for section S3 of the electrical-optical modulator 600. In FIG. 7, S+ refers to the RF voltage of the first signal electrode 602a (+ signal), S− refers to the RF voltage of the second signal electrode 602b (− signal), Vb1 refers to the bias voltage of the first bias electrode 608a, and Vb2 refers to the bias voltage of the second bias electrode 608b.

As shown by differential voltage graph 705, a positive change in S+ in section S1 increases a magnitude of the reverse bias in a semiconductor junction in the first waveguide 604a from AV1 to AV2. As shown by differential voltage graph 710, a positive change in S+ in section S3 decreases a magnitude of the reverse bias in a semiconductor junction in the first waveguide 604a from AV3 to AV4. Accordingly, an index change in the first waveguide 604a of S1 increases with an increase in magnitude of reverse bias voltage which occurs with a positive change in S+ while an index change in the first waveguide 604a of S3 decreases with a decrease in the magnitude of reverse bias voltage, which occurs with the same positive change in S+, thereby reversing modulation polarity in section S3 relative to section S1.

As indicated above, FIG. 7 is provided as an example. Other examples may differ from what is described with regard to FIG. 7.

Figure 8A:
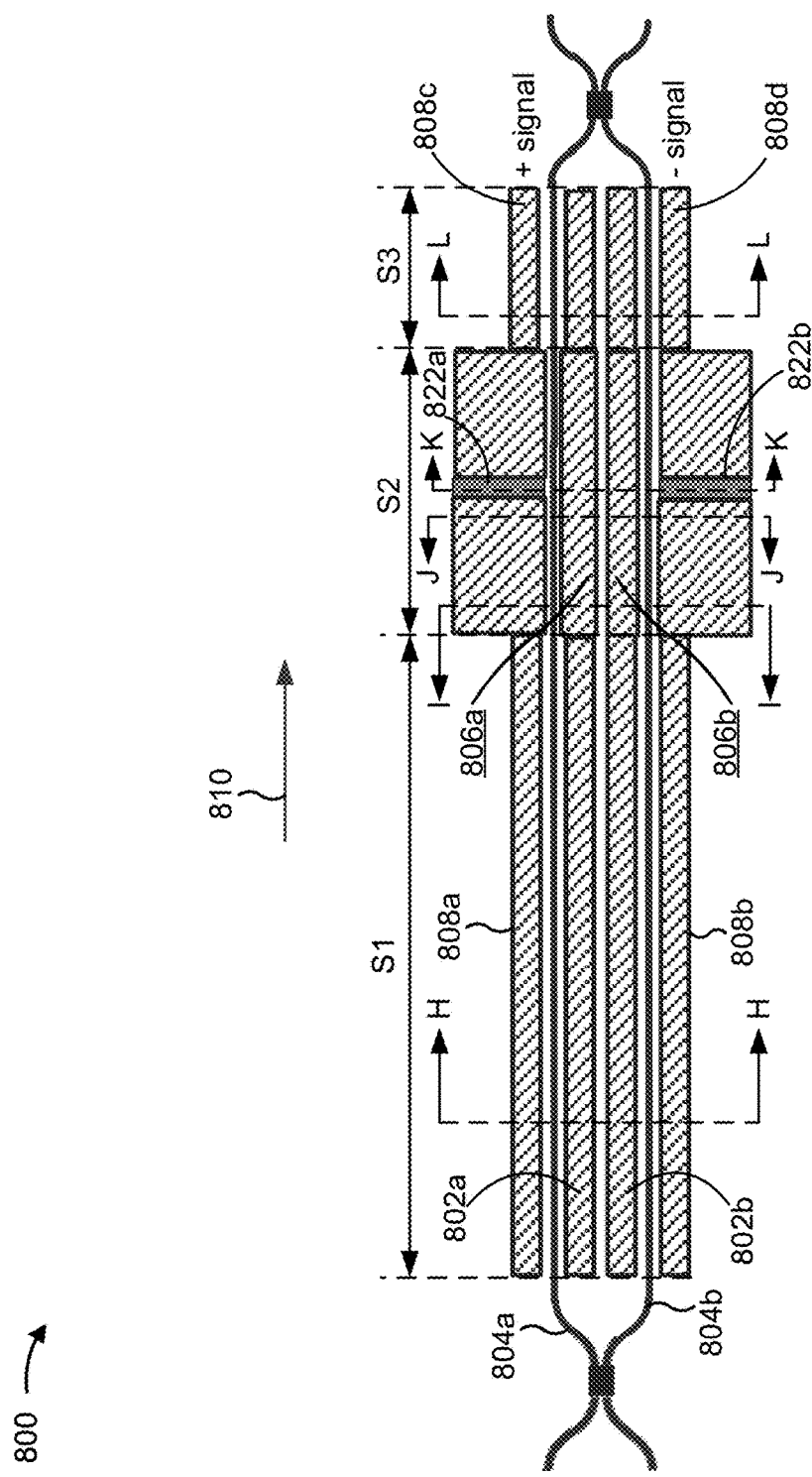
FIG. 8A is a diagram of an example electrical-optical modulator described herein.

FIG. 8A is a diagram of an example electrical-optical modulator 800 described herein. In some implementations, the electrical-optical modulator 800 may employ silicon photonics. As shown in FIG. 8A, electrical-optical modulator 800 may include a first signal electrode 802a (+ signal), a second signal electrode 802b (− signal), a first optical waveguide 804a, and a second optical waveguide 804b. Electrical signals of the signal electrodes 802 may interact with optical signals of the waveguides 804 based on a proximity between the signal electrodes 802 and the waveguides 804. The signal electrodes 802 may be configured to propagate an electrical signal in a direction of propagation 810 of the electrical-optical modulator 800, and the waveguides 804 may be configured to propagate an optical signal in the direction of propagation 810.

In addition, the first signal electrode 802a may be included in a first pair of dual-drive electrodes with a first ground electrode 808a, 808c, and the second signal electrode 802b may be included in a second pair of dual-drive electrodes with a second ground electrode 808b, 808d. Accordingly, the first waveguide 804a may be between the first pair of dual drive electrodes, and the second waveguide 804b may be between the second pair of dual drive electrodes. The first ground electrode 808a, 808c and the second ground electrode 808b, 808d may provide a first bias voltage (e.g., a first DC voltage) in section S1, and a second bias voltage (e.g., a second DC voltage) in section S3. In some implementations, the first bias voltage and the second bias voltage may have opposite polarities. The first ground electrode 808a, 808c may provide reverse biasing for a first semiconductor junction in the first waveguide 804a in section S1, and reverse biasing for a second semiconductor junction in the first waveguide 804a in section S3. The second ground electrode 808b, 808d may provide reverse biasing for a first semiconductor junction in the second waveguide 804b in section S1, and reverse biasing for a second semiconductor junction in the second waveguide 804b in section S3.

In some implementations, the first ground electrode 808a, 808c and the second ground electrode 808b, 808d are floated relative to DC signals and continuous relative to RF signals. For example, the first ground electrode 808a, 808c may include a discontinuity in section S2 in order to de-couple the bias voltage between section S1 and section S3 (e.g., the first ground electrode has a first segment corresponding to 808a and a second segment corresponding to 808c). Section S2 may include a first coupling capacitor 822a (e.g., multiple differently sized capacitors in parallel) associated with the first ground electrode 808a, 808c in order to maintain continuity of RF signals. Similarly, the second ground electrode 808b, 808d may include a discontinuity in section S2 (e.g., the second ground electrode has a first segment corresponding to 808b and a second segment corresponding to 808d), and section S2 may include a second coupling capacitor 822b (e.g., multiple differently sized capacitors in parallel) associated with the second ground electrode 808b, 808d. Moreover, first ends of the first ground electrode 808a and the second ground electrode 808b in section S1 may be associated with respective coupling capacitors (not shown), and second ends of the first ground electrode 808c and the second ground electrode 808d in section S3 may be associated with respective coupling capacitors (not shown).

As shown in FIG. 8A, the first signal electrode 802a may include a first modulation section (spanning S1), a velocity change section 806a (spanning S2), and a second modulation section (spanning S3). Similarly, the second signal electrode 802b may include a first modulation section (spanning S1), a velocity change section 806b (spanning S2), and a second modulation section (spanning S3). In a velocity change section 806, signals of a signal electrode 802 may have a different velocity relative to a first modulation section and/or a second modulation section of the signal electrode 802, as described above in connection with FIG. 1.

A first section (associated with section S1) and a second section (associated with section S3) of a waveguide 804 may be configured to have opposite modulation polarities based on an association with a first modulation section and a second modulation section of the signal electrodes 802. That is, section S1 and section S3 of the electrical-optical modulator 800 may have opposite modulation polarities. In some implementations, the opposite modulation polarities are based on a semiconductor structure associated with section S1 having a reversed orientation relative to a semiconductor structure associated with section S3, as described below.

In some implementations, portions of the waveguides 804 in section S1 and section S3 of the electrical-optical modulator 800 may be rib-type waveguides (shown in FIGS. 8B and 8F), as described above. Additionally, or alternatively, portions of the waveguides 804 in section S2 of the electrical-optical modulator 800 may be strip-type waveguides (shown in FIGS. 8C-8E), as described above.

As indicated above, FIG. 8A is provided as an example. Other examples may differ from what is described with regard to FIG. 8A.

Figure 8B:
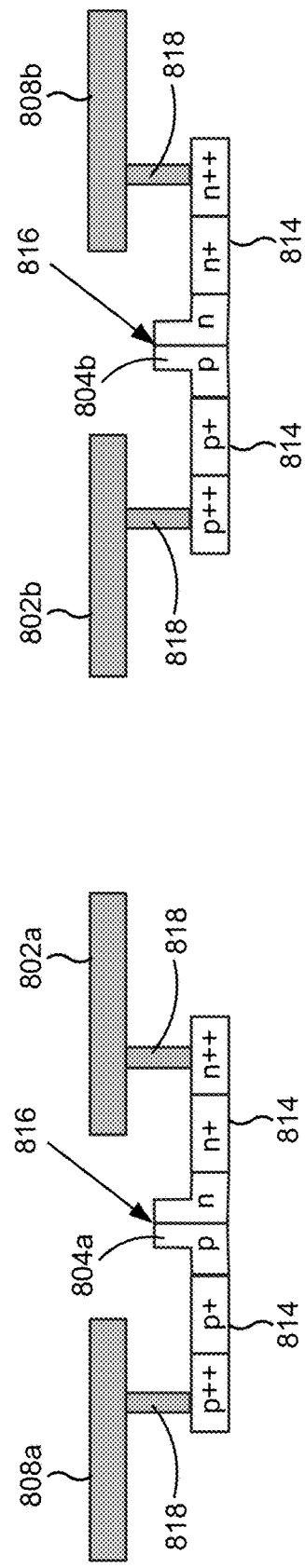
FIG. 8B is a cross-sectional view taken along line H-H of the electrical-optical modulator of FIG. 8A.

FIG. 8B is a cross-sectional view taken along line H-H of the electrical-optical modulator 800 of FIG. 8A. Section S1 of the electrical-optical modulator 800 may include a layer of semiconductor material. For example, the semiconductor material may be silicon. The semiconductor layer may include segmented semiconductor portions (e.g., bridges 814) that connect sections of the semiconductor layer, or include continuous connecting portions, as described in connection with FIG. 6B. In some implementations, the electrical-optical modulator 800 may include one or more additional layers (e.g., a substrate layer, oxide layers, metal layers, and/or the like) above and/or below the semiconductor layer, which are not shown in the cross-section for simplicity.

As shown in FIG. 8B, in section S1, the first signal electrode 802a and the first ground electrode 808a may respectively connect to a first portion of the semiconductor layer by connectors 818, and the second signal electrode 802b and the second ground electrode 808b may respectively connect to a second portion of the semiconductor layer by connectors 818. In section S1, the first ground electrode 808a and the second signal electrode 802b may be connected (e.g., electrically connected) to respective connection regions of the semiconductor layer having the second semiconductor type (e.g., p++). Additionally, the first signal electrode 802a and the second ground electrode 808b may be connected (e.g., electrically connected) to respective connection regions of the semiconductor layer having the first semiconductor type (e.g., n++).

The first portion of the semiconductor layer may extend laterally (e.g., orthogonal to the direction of propagation 810) between the first ground electrode 808a and the first signal electrode 802a. The second portion of the semiconductor layer may extend laterally between the second signal electrode 802b and the second ground electrode 808b.

In some implementations, the first portion and the second portion of the semiconductor layer may include first semiconductor junctions 816 in section S1 of the electrical-optical modulator 800. For example, a semiconductor junction 816 may be in the first waveguide 804a, and a semiconductor junction 816 may be in the second waveguide 804b. The first bias voltage of the first ground electrode 808a may provide reverse biasing to the semiconductor junction 816 in the first waveguide 804a, and the second bias voltage of the second ground electrode 808b may provide reverse biasing to the semiconductor junction 816 in the second waveguide 804b, in section S1.

In section S1, the first portion of the semiconductor layer and the second portion of the semiconductor layer may have a first semiconductor-type ordering. The first semiconductor-type ordering may include (e.g., sequentially from the first ground electrode 808a to the first signal electrode 802a, or from the second signal electrode 802b to the second ground electrode 808b) a region of the second type of semiconductor (e.g., p-type) adjacent to a region of the first type of semiconductor (e.g., n-type).

For example, in section S1, the first portion of the semiconductor layer may have a p-type semiconductor region adjacent to an n-type semiconductor region (e.g., sequentially from the first ground electrode 808a to the first signal electrode 802a), and the second portion of the semiconductor layer may have a p-type semiconductor region adjacent to an n-type semiconductor region (e.g., sequentially from the second signal electrode 802b to the second ground electrode 808b). Accordingly, in section S1, the semiconductor junction 816 in the first waveguide 604a may be a PN junction, and the semiconductor junction 816 in the second waveguide may be a PN junction. The semiconductor junctions 816 in the first waveguide 804a and the second waveguide 804b may extend parallel to the direction of propagation 810. In some implementations, the semiconductor junctions 816 in the first waveguide 804a and the second waveguide 804b may be orthogonal to the direction of propagation 810. For example, the first portion and the second portion of the semiconductor layer may employ interdigitated bridges, as described above.

As indicated above, FIG. 8B is provided as an example. Other examples may differ from what is described with regard to FIG. 8B.

Figure 8C:
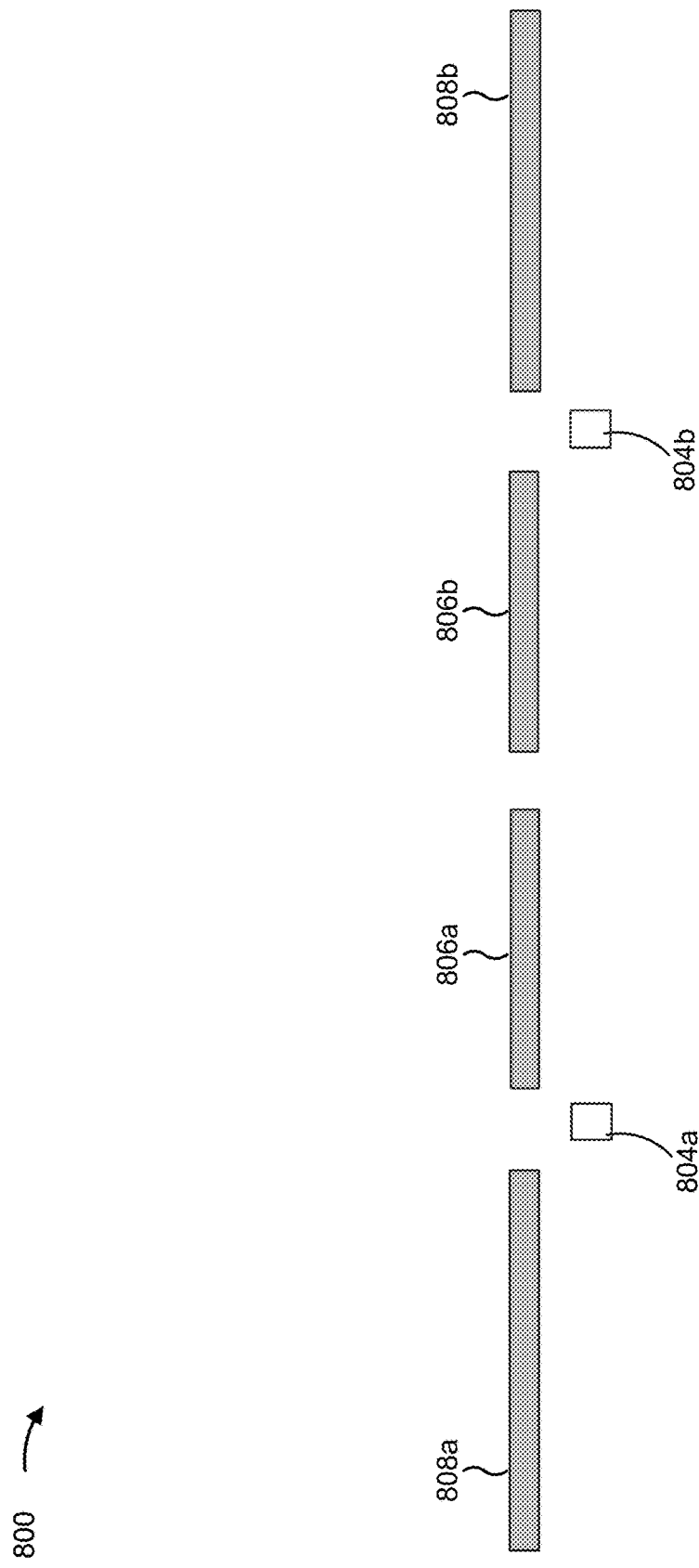
FIG. 8C is a cross-sectional view taken along line I-I of the electrical-optical modulator of FIG. 8A.

FIG. 8C is a cross-sectional view taken along line I-I of the electrical-optical modulator 800 of FIG. 8A. In some implementations, the electrical-optical modulator 800 may include one or more additional layers (e.g., a substrate layer, oxide layers, metal layers, and/or the like) above and/or below the semiconductor layer, which are not shown in the cross-section for simplicity.

As shown in FIG. 8C, in section S2, the first signal electrode 802a may include the velocity change section 806a, and the second signal electrode 802b may include the velocity change section 806b. For example, in section S2, the signal electrodes 802 may be wider relative to section S1 and section S3, and/or the signal electrodes 802 may be separated by a narrower gap relative to section S1 and section S3. Moreover, in section S2, the semiconductor layer may be etched to include the waveguides 804 without surrounding semiconductor material. In addition, in section S2, the waveguides 804 do not include a semiconductor junction. For example, in section S2, the first waveguide 804a may include a first continuous undoped semiconductor region, and the second waveguide 804b may include a second continuous undoped semiconductor region. In some implementations, section S2 may include an optical delay (e.g., in addition to, or instead of, wider signal electrodes 802), as described above.

As indicated above, FIG. 8C is provided as an example. Other examples may differ from what is described with regard to FIG. 8C.

Figure 8D:
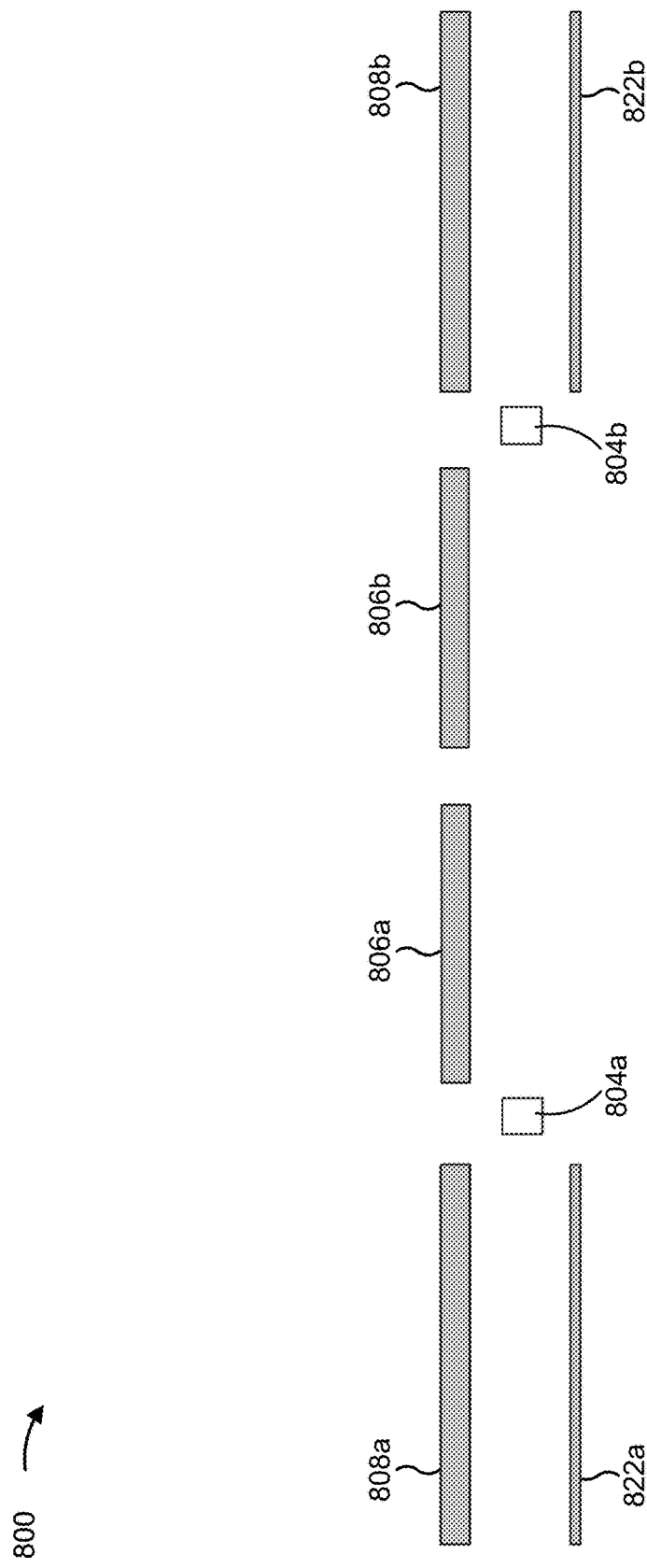
FIG. 8D is a cross-sectional view taken along line J-J of the electrical-optical modulator of FIG. 8A.

FIG. 8D is a cross-sectional view taken along line J-J of the electrical-optical modulator 800 of FIG. 8A. In some implementations, the electrical-optical modulator 800 may include one or more additional layers (e.g., a substrate layer, oxide layers, metal layers, and/or the like) above and/or below the semiconductor layer, which are not shown in the cross-section for simplicity. As shown in FIG. 8D, in section S2, the first coupling capacitor 822a (e.g., a coupling capacitor plate) may be positioned below a portion of the first ground electrode 808a, 808c, and the second coupling capacitor 822b (e.g., a coupling capacitor plate) may be positioned below a portion of the second ground electrode 808b, 808d.

As indicated above, FIG. 8D is provided as an example. Other examples may differ from what is described with regard to FIG. 8D.

Figure 8E:
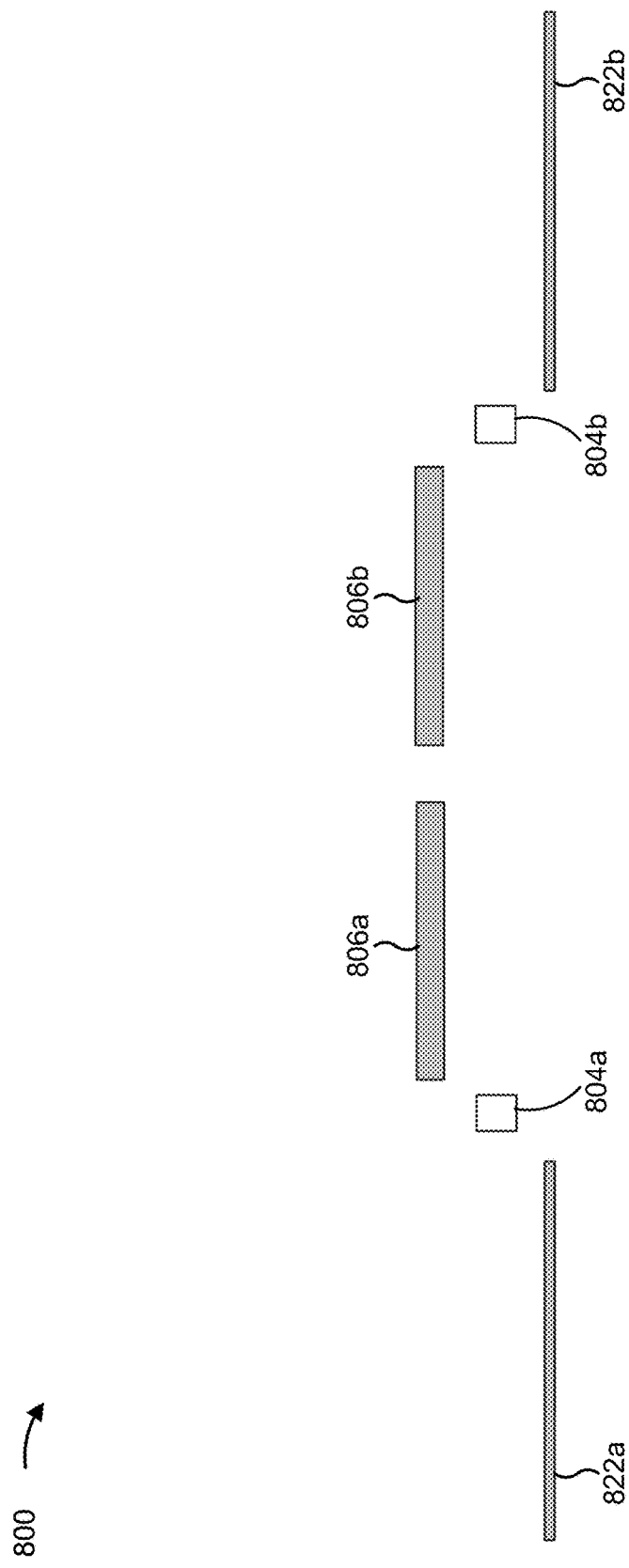
FIG. 8E is a cross-sectional view taken along line K-K of the electrical-optical modulator of FIG. 8A.

FIG. 8E is a cross-sectional view taken along line K-K of the electrical-optical modulator 800 of FIG. 8A. In some implementations, the electrical-optical modulator 800 may include one or more additional layers (e.g., a substrate layer, oxide layers, metal layers, and/or the like) above and/or below the semiconductor layer, which are not shown in the cross-section for simplicity. As shown in FIG. 8E, in section S2, the first ground electrode may include a discontinuity, and the first coupling capacitor 822a may overlap a gap between the first segment 808a of the first ground electrode and the second segment 808c of the first ground electrode. Similarly, the second ground electrode may include a discontinuity, and the second coupling capacitor 822b may overlap a gap between the first segment 808b of the second ground electrode and the second segment 808d of the second ground electrode.

As indicated above, FIG. 8E is provided as an example. Other examples may differ from what is described with regard to FIG. 8E.

Figure 8F:
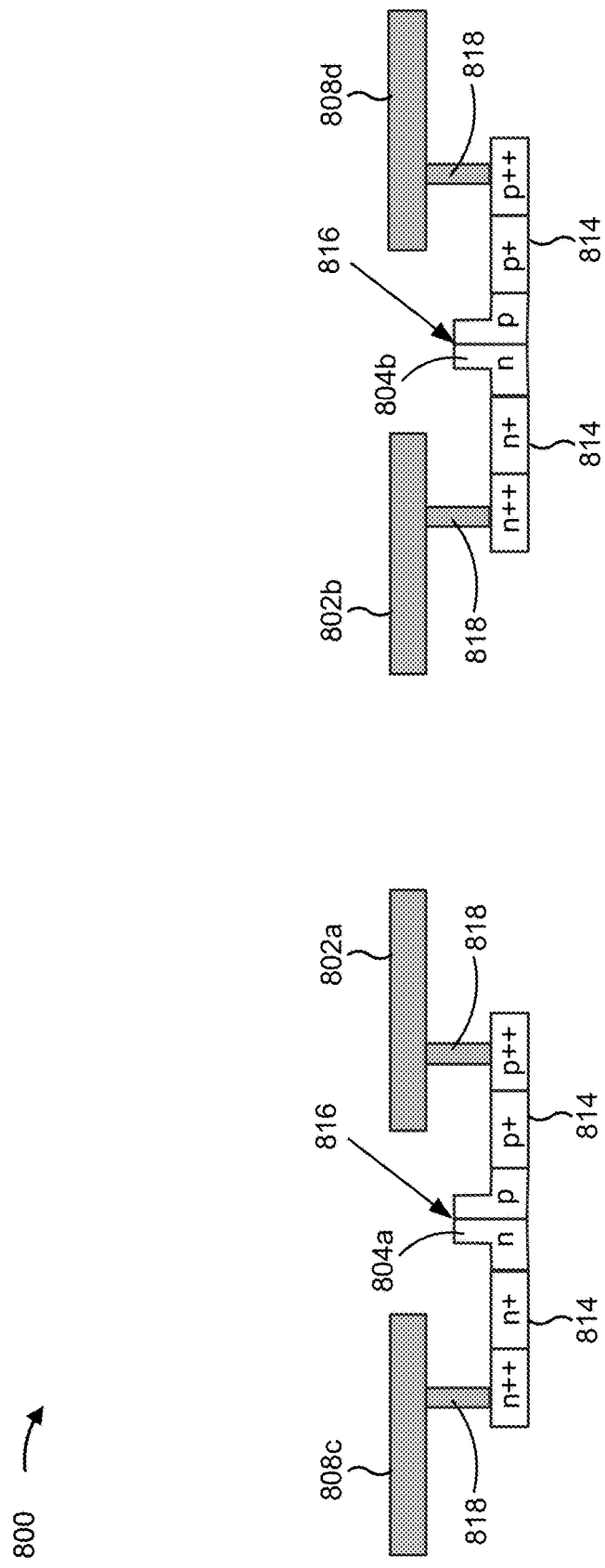
FIG. 8F is a cross-sectional view taken along line L-L of the electrical-optical modulator of FIG. 8A.

FIG. 8F is a cross-sectional view taken along line L-L of the electrical-optical modulator 800 of FIG. 8A. Section S3 of the electrical-optical modulator 800 may include the layer of semiconductor material, and multiple semiconductor bridges 814 may connect sections of the semiconductor layer, as described in connection with FIG. 8B. In some implementations, the electrical-optical modulator 800 may include one or more additional layers (e.g., a substrate layer, oxide layers, metal layers, and/or the like) above and/or below the semiconductor layer, which are not shown in the cross-section for simplicity.

As shown in FIG. 8F, in section S3, the first signal electrode 802a and the first ground electrode 808c may respectively connect to a first portion of the semiconductor layer by connectors 818, and the second signal electrode 802b and the second ground electrode 808d may respectively connect to a second portion of the semiconductor layer by connectors 818, as described above. In section S3, the first ground electrode 808c and the second signal electrode 802b may be connected (e.g., electrically connected) to respective connection regions of the semiconductor layer having the first semiconductor type (e.g., n++). Additionally, the first signal electrode 802a and the second ground electrode 808d may be connected (e.g., electrically connected) to respective connection regions of the semiconductor layer having the second semiconductor type (e.g., p++).

The first portion of the semiconductor layer may extend laterally (e.g., orthogonal to the direction of propagation 810) between the first ground electrode 808c and the first signal electrode 802a. The second portion of the semiconductor layer may extend laterally between the second signal electrode 802b and the second ground electrode 808d.

In some implementations, the first portion and the second portion of the semiconductor layer may include second semiconductor junctions 816 in section S3 of the electrical-optical modulator 800. For example, a semiconductor junction 816 may be in the first waveguide 804a, and a semiconductor junction 816 may be in the second waveguide 804b. The second semiconductor junctions 816 in section S3 may be reversed (e.g., reversed polarity) relative to the first semiconductor junctions 816 in section S1 (described in FIG. 8B). That is, a second semiconductor-type ordering in section S3 may be reversed relative to the first semiconductor-type ordering in section S1 (described in FIG. 8B).

For example, in section S3, the first portion of the semiconductor layer and the second portion of the semiconductor layer may have a second semiconductor-type ordering. The second semiconductor-type ordering may include (e.g., sequentially from the first ground electrode 808c to the first signal electrode 802a, or from the second signal electrode 802b to the second ground electrode 808d) a region of the first type of semiconductor (e.g., n-type) adjacent a region of the second type of semiconductor (e.g., p-type).

For example, in section S3, the first portion of the semiconductor layer may have an n-type semiconductor region adjacent to a p-type semiconductor region (e.g., sequentially from the first ground electrode 808c to the first signal electrode 802a), and the second portion of the semiconductor layer may have an n-type semiconductor region adjacent to an p-type semiconductor region (e.g., sequentially from the second signal electrode 802b to the second ground electrode 808d). Accordingly, in section S3, the semiconductor junction 816 in the first waveguide 804a may be an NP junction, and the semiconductor junction 816 in the second waveguide 804b may be an NP junction. The semiconductor junctions 816 in the first waveguide 804a and the second waveguide 804b may extend parallel to the direction of propagation 810. In some implementations, the semiconductor junctions 816 in the first waveguide 804a and the second waveguide 804b may be orthogonal to the direction of propagation 810. For example, the first portion and the second portion of the semiconductor layer may employ interdigitated bridges, as described above.

As indicated above, FIG. 8F is provided as an example. Other examples may differ from what is described with regard to FIG. 8F.

In some implementations, the bias voltages for the PN junctions are provided to signal electrodes 802a, 802b, 808c, and 808d with "bias tee" electrical networks that sum in the DC bias voltages with the RF signals, thereby providing a path for RF to travel from RF input to RF electrodes in sections S1, S2, and S3, to the RF termination, with a DC bias voltage applied to each RF signal electrode. In silicon photonic PICs, the bias tee networks may be integrated on chip with the electrical-optical modulator. The bias tee networks may introduce RF insertion loss at high frequencies as well as low frequency cut-off below which RF cannot pass.

Figure 9:
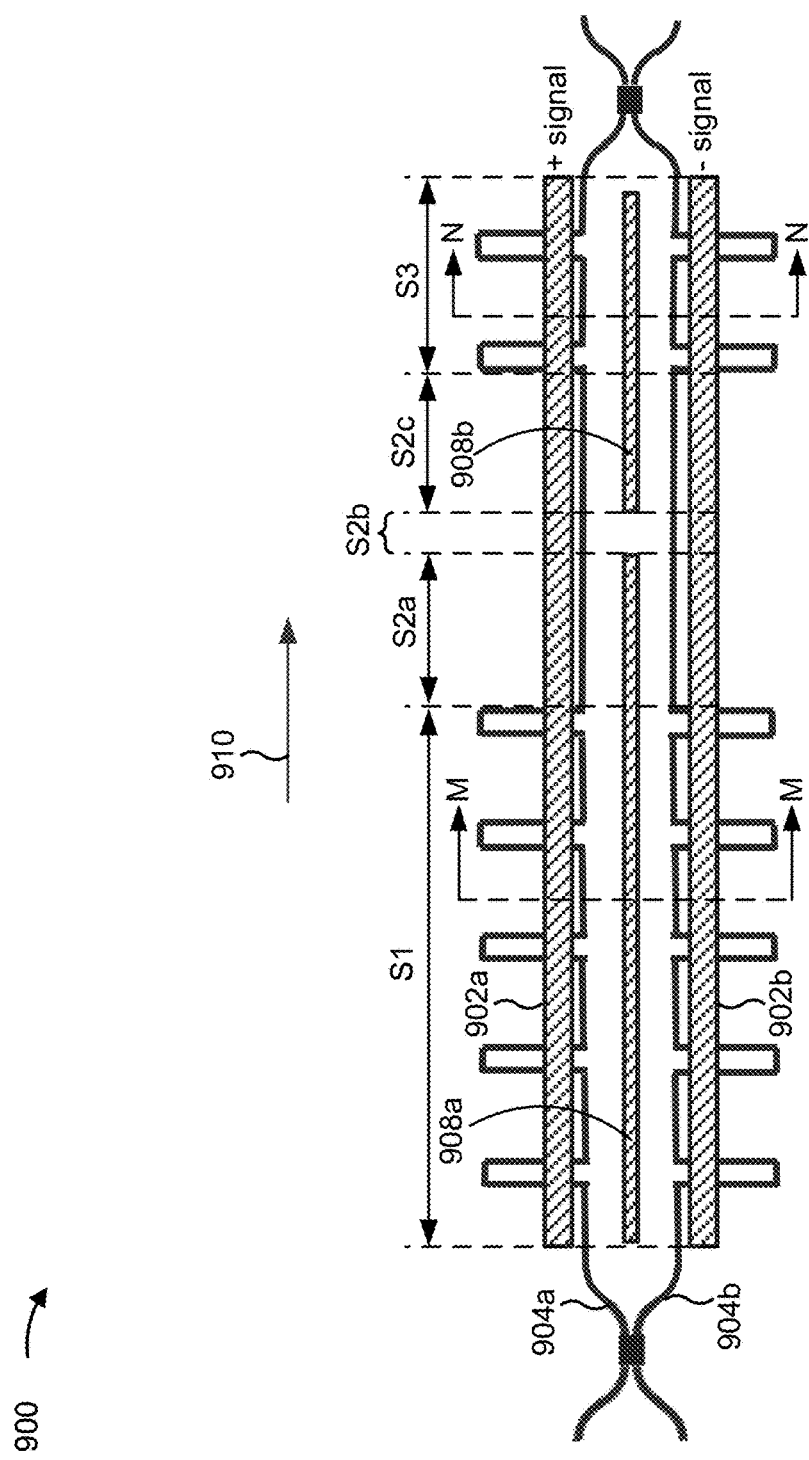
FIG. 9 is a diagram of an example electrical-optical modulator described herein.

FIG. 9 is a diagram of an example electrical-optical modulator 900 described herein. In some implementations, the electrical-optical modulator 900 may employ silicon photonics. As shown in FIG. 9, electrical-optical modulator 900 may include a first signal electrode 902a (+ signal), a second signal electrode 902b (− signal), a first optical waveguide 904a, and a second optical waveguide 904b. Electrical signals of the signal electrodes 902 may interact with optical signals of the waveguides 904 based on a proximity between the signal electrodes 902 and the waveguides 904. The signal electrodes 902 may be configured to propagate an electrical signal in a direction of propagation 910 of the electrical-optical modulator 900, and the waveguides 904 may be configured to propagate an optical signal generally (e.g. averaging over the circuitous path of the waveguides 904a and 904b) in the direction of propagation 910.

As shown in FIG. 9, the electrical-optical modulator 900 may include a first bias electrode 908a in section S1 and section S2a, and a second bias electrode 908b in section S2c and section S3. The first bias electrode 908a may be between the first waveguide 904a and the second waveguide 904b in section S1 and section S2a, and the second bias electrode 908b may be between the first waveguide 904a and the second waveguide 904b in section S2c and section S3.

The first bias electrode 908a and the second bias electrode 908b may be isolated (e.g., electrically isolated) from each other, as described in connection with FIG. 6A. For example, the first bias electrode 908a may provide reverse biasing for one or more first semiconductor junctions in section S1, and the second bias electrode 908b may provide reverse biasing for one or more second semiconductor junctions in section S3.

In some implementations, an RF signal of the signal electrodes 902 may have a lower velocity than an optical signal of the waveguides 904. Accordingly, the waveguides 904 may include optical delays in section S1 and section S3 which are shown, for example, by the circuitous, or back and forth, path of the waveguides 904a and 904b in FIG. 9, as described above.

As shown in FIG. 9, the first signal electrode 902a may include a first modulation section (spanning S1), a velocity change section (spanning S2), and a second modulation section (spanning S3). Similarly, the second signal electrode 902b may include a first modulation section (spanning S1), a velocity change section (spanning S2), and a second modulation section (spanning S3). In a velocity change section, signals of a signal electrode 902 may have a different relative velocity to the average velocity of the optical signal in waveguide 904, relative to a first modulation section and/or a second modulation section of the signal electrode 902, as described above in connection with FIG. 1.

For example, in the first and second modulation sections, the optical delays produced by circuitous, or back and forth, paths of the waveguides 904 reduce the average velocity of the optical signals in waveguides 904 such that the average velocity of the optical signals and the average velocity of the RF signals in electrodes 902 have a first difference (e.g., no difference). In the velocity change section (spanning S2), the optical delays are removed, thereby increasing the average optical velocity, such that the average velocity of the optical signals in waveguides 904 and the average velocity of the RF signals in electrodes 902 have a second difference greater than the first difference. Hence in the velocity change section (spanning S2), the average velocity of the RF signals in electrodes 902 is lower than the average velocity of the optical signals in waveguides 904.

A first section (associated with section S1) and a second section (associated with section S3) of a waveguide 904 may be configured to have opposite modulation polarities based on an association with a first modulation section and a second modulation section of the signal electrodes 902. That is, sections S1, S2a and sections S2c, S3 of the electrical-optical modulator 900 may have opposite modulation polarities. The electrical-optical modulator 900 may include a layer of semiconductor material. For example, the semiconductor material may be silicon. In some implementations, the opposite modulation polarities are based on a semiconductor structure associated with sections S1, S2a having a reversed orientation relative to a semiconductor structure associated with sections S2c, S3.

For example, in section S1 and section S2a, the semiconductor layer may have a semiconductor structure as described for section S1 of the electrical-optical modulator 600 (e.g., in one or more of FIGS. 6B-6F). As an example, a cross-section of the electrical-optical modulator 900 taken along line M-M may correspond to what is shown in FIG. 6C. Similarly, in section S2c and section S3, the semiconductor layer may have a semiconductor structure as described for section S3 of the electrical-optical modulator 600 (e.g., in one or more of FIGS. 6H-6L). As an example, a cross-section of the electrical-optical modulator 900 taken along line N-N may correspond to what is shown in FIG. 6I. Section S2b of the electrical-optical modulator 900 may be as described for section S2 of electrical-optical modulator 600 (e.g., in FIG. 6G). In some implementations, a length of section S2b is configured such that a width of signal electrodes 902a, 902b in section S2b is the same as in sections S1 and S3.

Thus, the configuration of the electrical-optical modulator 900 may be the same as the configuration of the electrical-optical modulator 600, as described above, except that the waveguides 904 of the electrical-optical modulator 900 may include optical delays, and a width of section S2b may be narrower than a width of section S2 of the electrical-optical modulator 600.

As indicated above, FIG. 9 is provided as an example. Other examples may differ from what is described with regard to FIG. 9.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An electrical-optical modulator, comprising:
   one or more optical waveguides to propagate optical signals in a direction of propagation; and
   one or more signal electrodes to propagate signals in the direction of propagation in order to modulate the optical signals through electrical-optical interaction,
   the one or more signal electrodes including a velocity change section, a first modulation section preceding the velocity change section in the direction of propagation, and a second modulation section following the velocity change section in the direction of propagation,
   the one or more signal electrodes including a first signal electrode and a second signal electrode, and the one or more optical waveguides including a first optical waveguide and a second optical waveguide,
   the first signal electrode including, in the first modulation section, first loading lines to interact with the first optical waveguide,
   the first signal electrode including, in the second modulation section, second loading lines that cross the first optical waveguide to interact with the second optical waveguide,
   the second signal electrode including, in the first modulation section, third loading lines to interact with the second optical waveguide,
   the second signal electrode including, in the second modulation section, fourth loading lines that cross the second optical waveguide to interact with the first optical waveguide,
   an optical waveguide, of the one or more optical waveguides, including a first section and a second section configured to be associated with opposite modulation polarities based on an association with the first modulation section and the second modulation section,
   the velocity change section being configured to increase or decrease a relative velocity of the signals to the optical signals relative to the first modulation section, and
   the electrical-optical modulator being configured to tailor a shape of an electrical-optical frequency response to target a particular frequency response bandwidth or shape.

2. The electrical-optical modulator of claim 1, wherein the first modulation section or the second modulation section has a first radio frequency (RF) mode index, and the velocity change section has a second RF mode index that is different than the first RF mode index.

3. The electrical-optical modulator of claim 1, wherein the first modulation section or the second modulation section has a first electrode width, and the velocity change section has a second electrode width that is greater than the first electrode width.

4. The electrical-optical modulator of claim 1, wherein the velocity change section does not include a loading line.

5. The electrical-optical modulator of claim 1, wherein the first modulation section or the second modulation section includes a first quantity of loading lines, and the velocity change section includes a second quantity of loading lines that is less than the first quantity of loading lines.

6. The electrical-optical modulator of claim 1, wherein the first section of the optical waveguide is disposed in a first semiconductor structure, and the second section of the optical waveguide is disposed in a second semiconductor structure.

7. The electrical-optical modulator of claim 1, wherein the opposite modulation polarities are based on an arrangement of the first loading lines, the second loading lines, the third loading lines, and the fourth loading lines.

8. An electrical-optical modulator, comprising:
   a first section configured for a first electrical-optical interaction between one or more optical waveguides and one or more signal electrodes;
   a second section configured to increase or decrease a relative velocity of signals of the one or more signal electrodes to optical signals of the one or more optical waveguides relative to the first section; and
   a third section configured for a second electrical-optical interaction between the one or more optical waveguides and the one or more signal electrodes according to an opposite modulation polarity relative to the first section,
   the one or more signal electrodes including a first signal electrode and a second signal electrode, and the one or more optical waveguides including a first optical waveguide and a second optical waveguide,
   the first signal electrode including, in the first section, first loading lines to interact with the first optical waveguide,
   the first signal electrode including, in the third section, second loading lines that cross the first optical waveguide to interact with the second optical waveguide,
   the second signal electrode including, in the first section, third loading lines to interact with the second optical waveguide,
   the second signal electrode including, in the third section, fourth loading lines that cross the second optical waveguide to interact with the first optical waveguide, and
   the first section, the second section, and the third section being collectively configured to tailor a shape of an electrical-optical frequency response to target a particular frequency response bandwidth or shape.

9. The electrical-optical modulator of claim 8, wherein the one or more signal electrodes in the first section or the third section have a first radio frequency (RF) mode index, and the one or more signal electrodes in the second section have a second RF mode index that is less than the first RF mode index.

10. The electrical-optical modulator of claim 8, wherein the one or more signal electrodes in the first section or the third section have a first electrode width, and the one or more signal electrodes in the second section have a second electrode width that is greater than the first electrode width.

11. The electrical-optical modulator of claim 8, wherein the one or more signal electrodes in the first section or the third section include a first quantity of loading lines, and the one or more signal electrodes in the second section include a second quantity of loading lines that is less than the first quantity of loading lines.

12. The electrical-optical modulator of claim 8, wherein a first optical section of an optical waveguide is disposed in a first semiconductor structure, and a second optical section of the optical waveguide is disposed in a second semiconductor structure.

13. The electrical-optical modulator of claim 8, wherein the opposite modulation polarity is based on an arrangement of the first loading lines, the second loading lines, the third loading lines, and the fourth loading lines.

14. An electrical-optical modulator, comprising:
- one or more velocity change sections including a first signal electrode, a second signal electrode, a first optical waveguide, and a second optical waveguide; and
- one or more modulation polarity reversal sections including the first signal electrode, the second signal electrode, the first optical waveguide, and the second optical waveguide,
  - the first signal electrode including, in a first modulation polarity reversal section of the one or more modulation polarity reversal sections, first loading lines to interact with the first optical waveguide,
  - the first signal electrode including, in a second modulation polarity reversal section of the one or more modulation polarity reversal sections, second loading lines that cross the first optical waveguide to interact with the second optical waveguide,
  - the second signal electrode including, in the first modulation polarity reversal section, third loading lines to interact with the second optical waveguide,
  - the second signal electrode including, in the second modulation polarity reversal section, fourth loading lines that cross the second optical waveguide to interact with the first optical waveguide,
  - the one or more velocity change sections being located between the first modulation polarity reversal section and the second modulation polarity reversal section,
  - the electrical-optical modulator having a frequency response characterized by a modulation bandwidth above a threshold value, and
  - the electrical-optical modulator being configured to tailor a shape of the frequency response to target a particular frequency response bandwidth or shape.

\* \* \* \* \*